(12) United States Patent
Jeong et al.

(10) Patent No.: US 12,379,469 B2
(45) Date of Patent: Aug. 5, 2025

(54) MULTI-CHANNEL LiDAR SENSOR MODULE

(71) Applicant: SOS Lab co., Ltd, Gwangju (KR)

(72) Inventors: Ji Seong Jeong, Gwangju (KR); Jun Hwan Jang, Seoul (KR); Dong Kyu Kim, Jinju-si (KR); Sung Ui Hwang, Jeollanam-do (KR); Bum Sik Won, Gwangju (KR); Gwang Bin Kim, Yeongju-si (KR)

(73) Assignee: SOS LAB CO., LTD, Gwangju (KR)

( * ) Notice: Subject to any disclaimer, the term of this patent is extended or adjusted under 35 U.S.C. 154(b) by 180 days.

(21) Appl. No.: 18/150,548

(22) Filed: Jan. 5, 2023

(65) Prior Publication Data
US 2023/0146379 A1   May 11, 2023

Related U.S. Application Data

(63) Continuation of application No. 16/440,082, filed on Jun. 13, 2019, now Pat. No. 11,579,254, which is a
(Continued)

(30) Foreign Application Priority Data

Aug. 2, 2017   (KR) .................. 10-2017-0097950
Feb. 15, 2019   (KR) .................. 10-2019-0017703

(51) Int. Cl.
*G01S 7/10*   (2006.01)
*G01S 7/48*   (2006.01)
(Continued)

(52) U.S. Cl.
CPC ............ *G01S 7/4808* (2013.01); *G01S 7/481* (2013.01); *G01S 7/4816* (2013.01);
(Continued)

(58) Field of Classification Search
CPC ...... G01S 7/4816; G01S 7/4861; G01S 17/10; G01S 17/931; H04N 23/74
See application file for complete search history.

(56) References Cited

U.S. PATENT DOCUMENTS

| 6,580,385 B1 * | 6/2003 | Winner ................. G01S 17/931 180/169 |
| 8,917,905 B1 | 12/2014 | Dill |

(Continued)

FOREIGN PATENT DOCUMENTS

| JP | 2007-214564 A | 8/2007 |
| JP | 2008-039719 A | 2/2008 |

(Continued)

OTHER PUBLICATIONS

Korean Intellectual Property Office, Notice of Allowance, Korean Patent Application No. 10-2019-0017703, Apr. 30, 2019, 5 pages.
(Continued)

*Primary Examiner* — Fabio S Lima
(74) *Attorney, Agent, or Firm* — Knobbe, Martens, Olson & Bear, LLP

(57) ABSTRACT

The present invention relates to a multi-channel lidar sensor module capable of measuring at least two target objects using one image sensor. The multi-channel lidar sensor module according to an embodiment of the present invention includes at least one pair of light emitting units configured to emit laser beams and a light receiving unit formed between the at least one pair of emitting units and configured to receive at least one pair of reflected laser beams which are emitted from the at least one pair of light emitting units and reflected by target objects.

13 Claims, 30 Drawing Sheets

Related U.S. Application Data continuation-in-part of application No. PCT/KR2017/012365, filed on Nov. 3, 2017.

(51) Int. Cl.

| | | |
|---|---|---|
| *G01S 7/481* | (2006.01) | |
| *G01S 7/4861* | (2020.01) | |
| *G01S 17/10* | (2020.01) | |
| *G01S 17/89* | (2020.01) | |
| *G02B 19/00* | (2006.01) | |
| *G02B 26/02* | (2006.01) | |
| *G06V 10/80* | (2022.01) | |
| *G06V 20/10* | (2022.01) | |
| *H04N 23/74* | (2023.01) | |

(52) U.S. Cl.
CPC ............ *G01S 7/4861* (2013.01); *G01S 17/10* (2013.01); *G01S 17/89* (2013.01); *G02B 19/00* (2013.01); *G02B 26/02* (2013.01); *G06V 10/803* (2022.01); *G06V 20/10* (2022.01); *H04N 23/74* (2023.01)

(56) References Cited

U.S. PATENT DOCUMENTS

| | | | |
|---|---|---|---|
| 11,044,403 B2 | 6/2021 | Shibusawa et al. | |
| 2003/0088361 A1* | 5/2003 | Sekiguchi | G01S 17/86 340/436 |
| 2005/0232466 A1 | 10/2005 | Kampchen et al. | |
| 2007/0219720 A1* | 9/2007 | Trepagnier | G05D 1/024 701/300 |
| 2008/0150786 A1* | 6/2008 | Breed | B60W 30/04 342/53 |
| 2010/0121577 A1* | 5/2010 | Zhang | G06V 20/588 382/104 |
| 2012/0081542 A1 | 4/2012 | Suk et al. | |
| 2012/0287417 A1 | 11/2012 | Mimeault | |
| 2013/0229645 A1 | 9/2013 | Suzuki et al. | |
| 2014/0104051 A1* | 4/2014 | Breed | G06V 20/56 340/435 |
| 2014/0132956 A1 | 5/2014 | Umeda et al. | |
| 2014/0169392 A1 | 6/2014 | Kim | |
| 2015/0025843 A1 | 1/2015 | Takemura | |
| 2015/0062555 A1 | 3/2015 | Kim | |
| 2016/0061612 A1 | 3/2016 | You et al. | |
| 2016/0116593 A1 | 4/2016 | Kim et al. | |
| 2017/0180707 A1* | 6/2017 | Hsu | H04N 23/745 |
| 2017/0219713 A1 | 8/2017 | Gruver et al. | |
| 2017/0263798 A1* | 9/2017 | Suzuki | H10F 77/1228 |
| 2018/0252811 A1 | 9/2018 | Park et al. | |
| 2020/0183151 A1 | 6/2020 | Nanjyo et al. | |

FOREIGN PATENT DOCUMENTS

| | | |
|---|---|---|
| JP | 2014-517921 A | 7/2014 |
| JP | 2016-051606 A | 4/2016 |
| KR | 10-1996-0002109 A | 1/1996 |
| KR | 10-2006-0091137 A | 8/2006 |
| KR | 10-2008-0005639 A | 1/2008 |
| KR | 10-2012-0059819 A | 6/2012 |
| KR | 10-2013-0015080 A | 2/2013 |
| KR | 10-2013-0119601 A | 11/2013 |
| KR | 10-2014-0006510 A | 1/2014 |
| KR | 10-2014-0079090 A | 6/2014 |
| KR | 10-2015-0027543 A | 3/2015 |
| KR | 10-2015-0051735 A | 5/2015 |
| KR | 10-2015-0052469 A | 5/2015 |
| KR | 10-2015-0091779 A | 8/2015 |
| KR | 10-2015-010749 A | 9/2015 |
| KR | 10-2015-0101749 A | 9/2015 |
| KR | 10-2015-0142542 A | 12/2015 |
| KR | 10-2016-0020620 A | 2/2016 |
| KR | 10-2016-0027817 A | 3/2016 |
| KR | 10-2016-0047863 A | 5/2016 |
| KR | 10-2017-0030313 A | 3/2017 |
| KR | 10-2017-0088113 A | 8/2017 |
| KR | 101779255 B1 | 9/2017 |
| WO | WO 2013/015145 A1 | 1/2013 |

OTHER PUBLICATIONS

Korean Intellectual Property Office, Notice of Allowance, Korean Patent Application No. 10-2017-0176361, Nov. 20, 2019, three pages.
Korean Intellectual Property Office, Notice of Allowance, Korean Patent Application No. 10-2017-0097950, Oct. 7, 2019, seven pages.
Korean Intellectual Property Office, Office Action, Korean Patent Application No. 10-2017-0097950, Nov. 12, 2018, 11 pages.
Korean Intellectual Property Office, Office Action, Korean Patent Application No. 10-2017-0176361, Jun. 2, 2019, 12 pages.
PCT International Search Report, PCT Application No. PCT/KR2017/012365, Apr. 16, 2018, 2 pages.

* cited by examiner

4000

10000

MULTI-CHANNEL LiDAR SENSOR MODULE

CROSS-REFERENCE TO RELATED APPLICATIONS

This application is a continuation of U.S. application Ser. No. 16/440,082, filed Jun. 13, 2019, which is a continuation-in-part of International Application No. PCT/KR2017/012365 filed on Nov. 3, 2017, which claims priority to Republic of Korea Patent Application No. 10-2017-0097950 filed on Aug. 2, 2017 and Republic of Korea Patent Application No. 10-2019-0017703 filed on Feb. 15, 2019, each of which are incorporated by reference herein in their entirety.

BACKGROUND

1. Technical Field

The present invention relates to a lidar sensor module, and more particularly, to a multi-channel lidar sensor module capable of measuring at least two target objects using one image sensor.

2. Description of the Prior Art

Light amplification by the stimulated emission of radiation (LASER) causes stimulated emission of light to amplify the light and irradiate a laser.

Light detection and ranging (LiDAR) is technology for measuring a distance using a laser. The LiDAR has been developed into a form for building topography data for building three-dimensional geographic information system (GIS) information and visualizing the built topography data. Accordingly, the LiDAR has been applied in a construction field, a defense field, and the like.

FIG. 1 is a view illustrating a lidar sensor module according to the related art.

As shown in FIG. 1, the lidar sensor module according to the related art includes a light emitting unit 10 and a light receiving unit 20. The light emitting unit 10 includes a laser diode 11 configured to emit a laser beam and a collimating lens 12 configured to condense and convert the emitted laser beam into a parallel beam. The light receiving unit 20 includes a condensing lens 21 configured to condense and convert a laser beam reflected by an obstacle (target object) A into a parallel beam and an image sensor 22 configured to receive the laser beam condensed by the condensing lens 21. A band pass filter 23 is disposed between the condensing lens 21 and the image sensor 22 to transmit only a reflected laser beam in a wavelength range emitted from the light emitting unit 10 and to not transmit beams in other wavelength ranges.

In the case of the lidar sensor module of the related art as configured above, one light emitting unit and one light receiving unit constitute one lidar sensor module. Accordingly, the lidar sensor module of the related art may sense one target object A existing on a light source optical axis and measure a distance to the target object A.

On the other hand, the lidar sensor module is used to detect surrounding obstacles in autonomous vehicles, autonomous driving drones, and the like. For example, when the lidar sensor module is used in the autonomous vehicle, a plurality of lidar modules are required to detect the front, rear, left, and right of the vehicle. In addition, since it is necessary to detect upper and lower ends with respect to one direction, at least two lidar sensor modules are also required for the same direction.

As described above, since the lidar sensor module of the related art can detect/measure only one target object A existing on the light source optical axis, when n channels are required, n lidar sensor modules are required, which increases costs and an occupied space.

SUMMARY

The present invention is directed to providing a multi-channel lidar sensor module capable of measuring two target objects using one image sensor.

The present invention is directed to providing an object information acquiring apparatus which acquires distance information and type information related to an object using a single sensor.

Technical solutions of the present invention may not be limited to the above, and other technical solutions of the present invention will be clearly understandable to those having ordinary skill in the art from the disclosures provided below together with the accompanying drawings.

According to an embodiment of the present invention, a multi-channel lidar sensor module includes at least one pair of light emitting units configured to emit laser beams and a light receiving unit formed between the at least one pair of emitting units and configured to receive at least one pair of reflected laser beams which are emitted from the at least one pair of light emitting units and reflected by target objects.

The at least one pair of light emitting units may be disposed in a vertical direction or in parallel in a horizontal direction with respect to the ground.

The light receiving unit may include a condensing lens configured to condense the at least one pair of reflected laser beams and an image sensor configured to receive the condensed laser beams from the condensing lens, and one laser beam of the at least one pair of reflected laser beams is received in one region of the image sensor and the other laser beam of the at least one pair of reflected laser beams is received in the other region of the image sensor.

The at least one pair of light emitting units may be provided with a plurality of pairs of light emitting units, each of the pairs of light emitting units may be disposed around the light receiving unit and may face the light receiving unit, and the light emitting units provided with the plurality of pairs of light emitting units may be controlled such that emission periods thereof do not overlap each other.

The multi-channel lidar sensor module may further include an optical filter unit configured to adjust transmittance of the reflected laser beam received by the light receiving unit.

The optical filter unit may be an optical film having a preset size and shape, and a transmittance slope may be formed on a surface of the optical film such that transmittance is adjusted according to a distance between the light emitting unit and the target object.

Transmittance of a central portion of the optical film may be highest, and transmittance may be gradually decreased in a direction from the central portion to a peripheral portion of the optical film.

The light receiving unit may include a condensing lens configured to condense the reflected laser beam, an image sensor configured to receive the condensed laser beam from the condensing lens, and a band pass filter formed between the condensing lens and the image sensor, wherein the optical filter unit is formed by being applied on a surface of the band pass filter or a surface of the image sensor.

The optical filter unit may be formed by applying a coating material such that transmittance is highest at a central portion of the surface of the band pass filter or the surface of the image sensor and applying the coating material such that transmittance is gradually decreased in a direction toward a peripheral portion of the surface of the band pass filter or the surface of the image sensor.

According to an embodiment of the present invention, an object information acquiring apparatus may be provided. The apparatus may acquire object information including type information and distance information related to an object, include a camera module configured to capture a periphery thereof; a laser module spaced apart from the camera module in a direction of a perpendicular axis and configured to emit a laser beam in a form of a line extending in a direction of a horizontal axis; and a controller configured to acquire a first image captured by the camera module at an emission timing of the laser module and a second image captured by the camera module at a non-emission timing of the laser module, acquire, when the first image is captured, distance information related to an object included in the first image based on a position in the direction of the perpendicular axis, at which the laser beam is received on the first image, and when the second image is captured, acquire type information related to an object included in the second image based on a pixel value of the second image.

According to another embodiment, a method of acquiring object information may be provided. The method may be performed by an object information acquiring apparatus including a camera module configured to capture a periphery thereof and a laser module spaced apart from the camera module in a direction of a perpendicular axis and configured to emit a laser beam in a form of a line extending in a direction of a horizontal axis, include acquiring a plurality of images including a first image captured by the camera module at an emission timing of the laser module and a second image captured by the camera module at a non-emission timing of the laser module; acquiring distance information related to an object included in the first image based on a position in the direction of the perpendicular axis, at which the laser beam is received on the first image; based on the acquired distance information, determining whether a distance from the object information acquiring apparatus to the object is within a predetermined distance; and when the distance from the object information acquiring apparatus to the object is within the predetermined distance as a determination result, acquiring type information related to an object included in the second image based on a pixel value of the second image.

According to still another embodiment, a method of acquiring object information may be provided. The method may be performed by an object information acquiring apparatus including a camera module configured to capture a periphery thereof and a laser module spaced apart from the camera module in a direction of a perpendicular axis and configured to emit a laser beam in a form of a line extending in a direction of a horizontal axis, include acquiring a plurality of images including a first image captured by the camera module at an emission timing of the laser module and a second image captured by the camera module at a non-emission timing of the laser module; acquiring type information related to an object included in the second image based on a pixel value of the second image; determining whether an object having a predetermined classification value is included in the second image; and when the object having the predetermined classification value is included in the second image, acquiring distance information related to an object included in the first image based on a position in the direction of the perpendicular axis, at which the laser beam is received on the first image.

According to still another embodiment, a multi-channel lidar sensor module may be provided. The module may comprise a light emitting unit including at least one pair of emitting units for emitting laser beams; and a light receiving unit formed between the at least one pair of emitting units and configured to receive at least one pair of reflected laser beams that are emitted from the at least one pair of emitting units and reflected by a target object.

Herein, the at least one pair of light emitting units may be disposed in a vertical direction or in parallel in a horizontal direction with respect to the ground.

Herein, the light receiving unit may include a condensing lens configured to condense the at least one pair of reflected laser beams and an image sensor configured to receive the condensed laser beams from the condensing lens, and one laser beam of the at least one pair of reflected laser beams may be received in one region of the image sensor and the other laser beam of the at least one pair of reflected laser beams is received in the other region of the image sensor.

Herein, the at least one pair of light emitting units may be provided with a plurality of pairs of light emitting units, each of the pairs of light emitting units is disposed around the light receiving unit and faces the light receiving unit, and the light emitting units provided with the plurality of pairs of light emitting units may be controlled such that emission periods thereof do not overlap each other.

Herein, the multi-channel lidar sensor module may further comprise an optical filter unit configured to adjust transmittance of the reflected laser beam received by the light receiving unit.

Herein, the optical filter unit may be an optical film having a preset size and shape, and a transmittance slope may be formed on a surface of the optical film such that transmittance is adjusted according to a distance between the light emitting unit and the target object.

Herein, transmittance of a central portion of the optical film may be highest, and transmittance may be gradually decreased in a direction from the central portion to a peripheral portion of the optical film.

Herein, the light receiving unit may include: a condensing lens configured to condense the reflected laser beam; an image sensor configured to receive the condensed laser beam from the condensing lens; and a band pass filter formed between the condensing lens and the image sensor, wherein the optical filter unit may be formed by being applied on a surface of the band pass filter or a surface of the image sensor.

Herein, the optical filter unit may be formed by applying a coating material such that transmittance is highest at a central portion of the surface of the band pass filter or the surface of the image sensor and applying the coating material such that transmittance is gradually decreased in a direction toward a peripheral portion of the surface of the band pass filter or the surface of the image sensor.

Technical solutions of the present invention may not be limited to the above, and other technical solutions of the present invention will be clearly understandable to those having ordinary skill in the art from the disclosures provided below together with the accompanying drawings.

According to a multi-channel lidar sensor module according to an embodiment of the present invention, it is possible to provide a multi-channel lidar sensor module including one light receiving unit and a plurality of light emitting units. Therefore, it is possible to detect a plurality of target objects (A) existing on a plurality of light source optical axes and measure distances to the target objects using one multi-channel lidar sensor module.

In addition, the plurality of target objects (A) can be detected/measured using one multi-channel lidar sensor module, thereby considerably reducing costs of purchasing a plurality of lidar sensor modules and solving a space problem caused by the plurality of lidar sensor modules.

Furthermore, transmittance of a reflected laser beam received by the light receiving unit can be adjusted according to a distance to the target object, thereby performing accurate measurement on multiple regions.

That is, a light amount of a laser beam received by an image sensor can be uniformly maintained at a certain level due to a difference of the light amount according to a distance to the target object being minimized, thereby performing accurate measurement on both a near distance region and a long distance region.

According to an embodiment, distance information and type information related to an object can be acquired using a single sensor.

Effects of the present invention may not be limited to the above, and other effects of the present invention will be clearly understandable to those having ordinary skill in the art from the disclosures provided below together with accompanying drawings.

DETAILED DESCRIPTION

Figure 1:
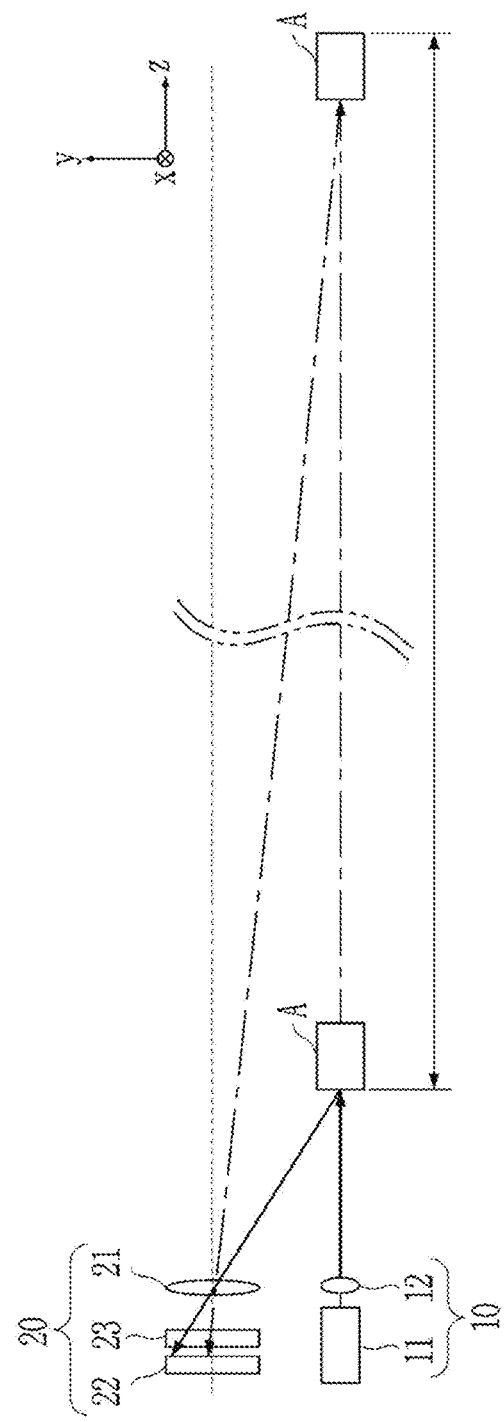
FIG. 1 is a view illustrating a lidar sensor module according to the related art.

The present invention has various modifications and embodiments, and the descriptions of the present invention will be described along with specific embodiments with reference to the accompanying drawings. However, it is not intended that the present invention is limited to the specific embodiments, and it is to be interpreted that all the conversions, equivalents and substitutions belonging to the concept and technical scope of the present invention are included in the present invention.

Terms used in the present invention are used for the sake of describing the specific embodiments and are not intended to limit the present invention. As used herein, the singular forms "a," "an," and "the" are intended to include the plural forms as well, unless the context clearly indicates otherwise. It will be understood that terms such as "comprise," "include," and "have," when used herein, specify the presence of stated features, integers, steps, operations, elements, components, or combinations thereof, but do not preclude the presence or addition of one or more other features, integers, steps, operations, elements, components, or combinations thereof. Hereinafter, a multi-channel lidar sensor module according to embodiments of the present invention will be described with reference to the drawings.

According to an embodiment, there may be provided an object information acquiring apparatus, which acquires object information including type information and distance information related to an object, includes: a camera module configured to capture a periphery thereof; a laser module spaced apart from the camera module in a direction of a perpendicular axis and configured to emit a laser beam in a form of a line extending in a direction of a horizontal axis; and a controller configured to acquire a first image captured by the camera module at an emission timing of the laser module and a second image captured by the camera module at a non-emission timing of the laser module, and, when the first image is captured, acquire distance information related to an object included in the first image based on a position in the direction of the perpendicular axis, at which the laser beam is received on the first image, and when the second image is captured, acquire type information related to an object included in the second image based on a pixel value of the second image.

Here, the camera module may include a sensing unit including a plurality of sensing elements arranged in an array form the direction of the perpendicular axis.

The sensing unit may be divided into a first region and a second region different from the first region and may include a first sensor, which is provided in the first region and acquires a laser beam image, and a second sensor which is provided in the second region and acquires a reflection image.

The controller may increase a threshold value of the sensing unit, acquire a third image captured by the sensing unit of which the threshold value is increased at the emission timing of the laser module, and acquire distance information related to an object included in the third image based on the third image.

The controller may include a distance calculation unit configured to acquire the distance information based on a pixel position of a laser beam image on the first image and an object recognition unit configured to acquire the type information based on the pixel value of the second image, wherein the laser beam image indicates a laser beam that is emitted from the laser module, reflected from the object, and then received by the camera module.

The object recognition unit may include an artificial neural network.

The object information acquiring apparatus may further include a light-emitting diode (LED) module configured to emit light to the object at the non-emission timing of the laser module such that accuracy of the type information is improved.

When the object information acquiring apparatus is installed on a moving body, the controller may generate a traveling control signal of the moving body based on the object information.

The moving body may be at least one of an automated guided vehicle, a mobile robot, a vehicle, and an unmanned aerial vehicle.

According to another embodiment, there may be provided a method of acquiring object information which is performed by an object information acquiring apparatus including a camera module configured to capture a periphery thereof and a laser module spaced apart from the camera module in a direction of a perpendicular axis and configured to emit a laser beam in a form of a line extending in a direction of a horizontal axis, includes: acquiring a plurality of images including a first image captured by the camera module at an emission timing of the laser module and a second image captured by the camera module at a non-emission timing of the laser module; acquiring distance information related to an object included in the first image based on a position in the direction of the perpendicular axis, at which the laser beam is received on the first image; determining, based on the acquired distance information, whether a distance from the object information acquiring apparatus to the object is within a predetermined distance; and when the distance from the object information acquiring apparatus to the object is within the predetermined distance as a determination result, acquiring type information related to an object included in the second image based on a pixel value of the second image.

When the object information acquiring apparatus is installed on a moving body, the method of acquiring the object information may further include generating a traveling control signal of the moving body based on the acquired distance information and type information.

According to still another embodiment, there may be provided a method of acquiring object information which is performed by an object information acquiring apparatus including a camera module configured to capture a periphery thereof and a laser module spaced apart from the camera module in a direction of a perpendicular axis and configured to emit a laser beam in a form of a line extending in a direction of a horizontal axis, includes acquiring a plurality of images including a first image captured by the camera module at an emission timing of the laser module and a second image captured by the camera module at a non-emission timing of the laser module; acquiring type information related to an object included in the second image based on a pixel value of the second image; determining whether an object having a predetermined classification value is included in the second image; and when the object having the predetermined classification value is included in the second image, acquiring distance information related to an object included in the first image based on a position in the direction of the perpendicular axis at which the laser beam is received on the first image.

When the object information acquiring apparatus is installed in a moving body, the method of acquiring the object information may further include generating a traveling control signal of the moving body based on the acquired distance information and type information.

There may be provided a recording medium which stores a program for performing any one of the above-described methods of acquiring the object information.

In the multi-channel lidar sensor module according to the embodiment of the present invention, at least two light emitting units may be coupled to one light receiving unit, and thus, the one light receiving unit may detect a target object existing on a light source optical axis of the at least two light emitting units and may measure a distance to the target object.

Figure 2:
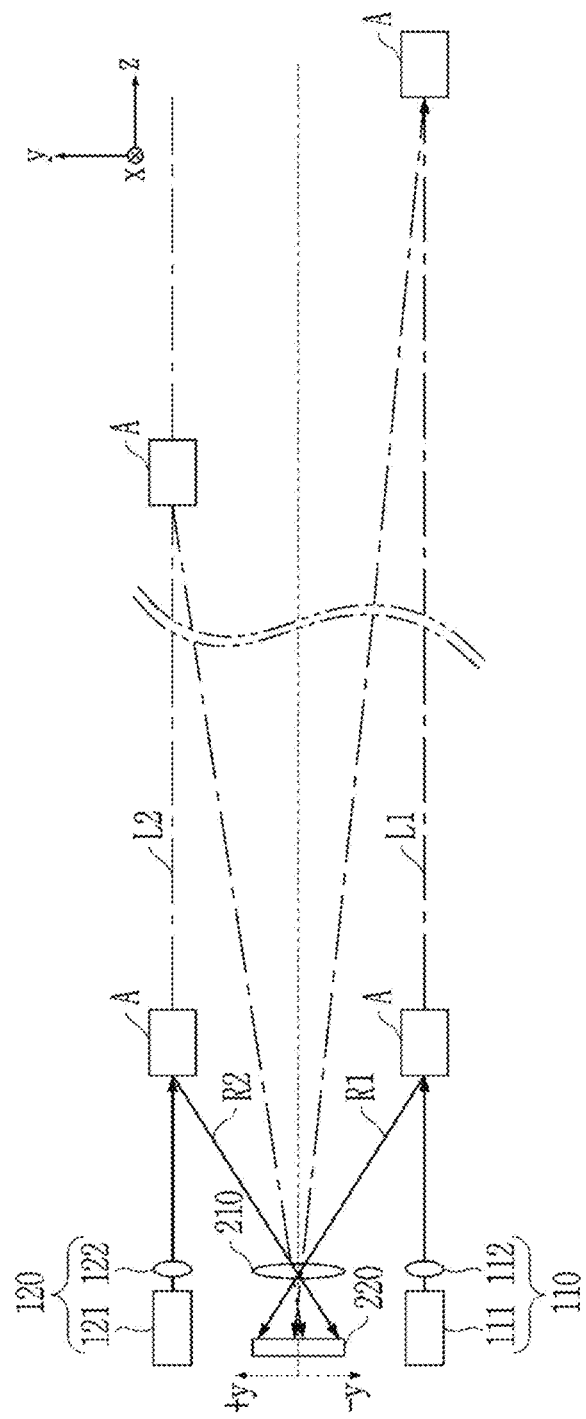
FIGS. 2 and 3 are views illustrating a multi-channel lidar sensor module according to an embodiment of the present invention.
Figure 3:
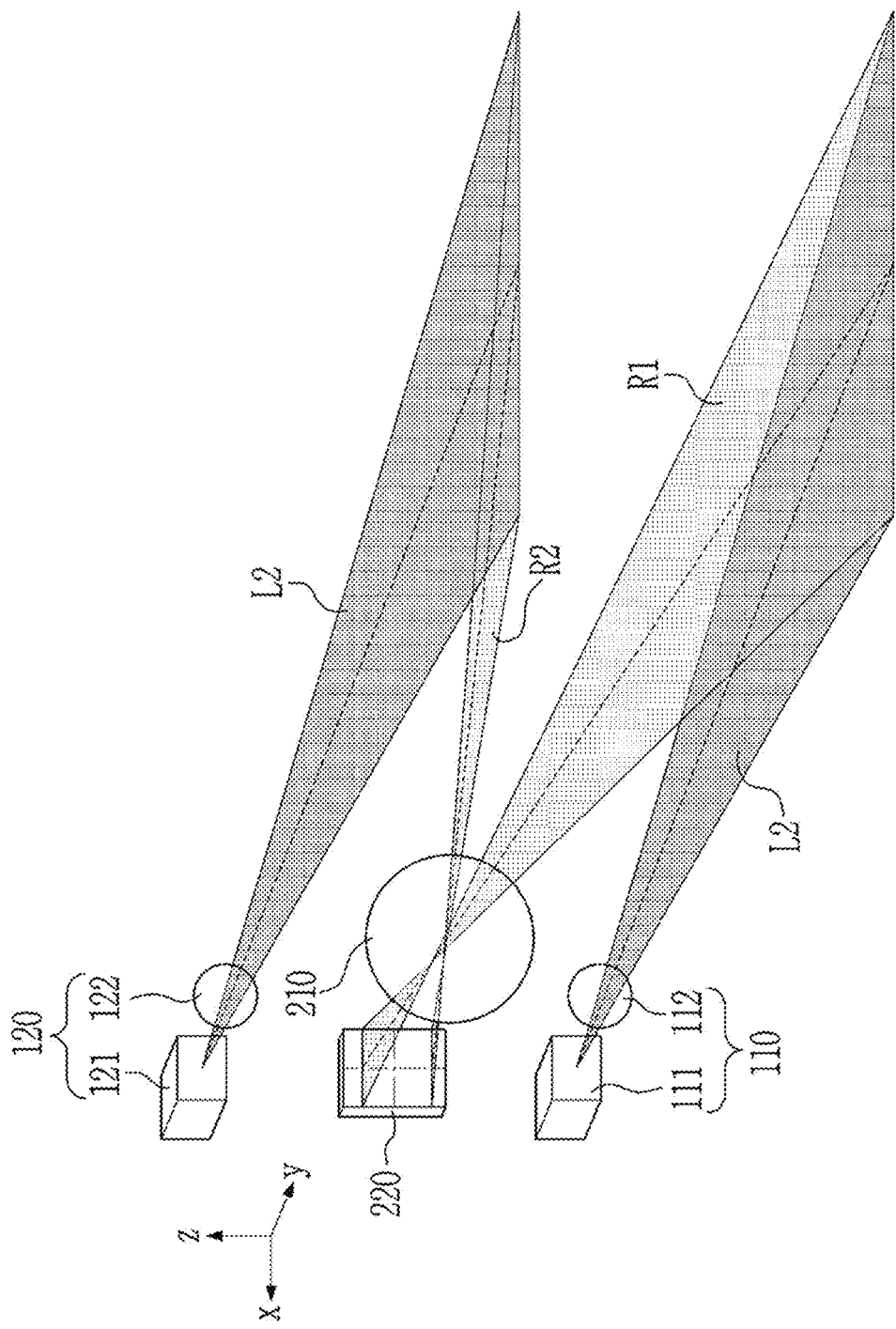

FIGS. 2 and 3 are views illustrating the multi-channel lidar sensor module according to the embodiment of the present invention. As shown in FIGS. 2 and 3, the multi-channel lidar sensor module according to the embodiment of the present invention includes a first light emitting unit 110, a second light emitting unit 120, and a light receiving unit 200 (210 and 220)

The first light emitting unit 110 and the second light emitting unit 120 emit laser beams on light source optical axes. The first light emitting unit 110 emits a laser beam along an optical axis L1, and the second light emitting unit 120 emits a laser beam along an optical axis L2.

The first light emitting unit 110 and the second light emitting unit 120 include laser diodes 111 and 121 configured to generate a laser beam and collimating lenses 112 and 122.

The laser diodes 111 and 121 are optical elements configured to generate a laser beam. The collimating lenses 112 and 122 are optical lenses configured to convert the laser beam generated by the laser diodes into a parallel beam and disposed behind the laser diodes.

The light receiving unit 200 is disposed between the first light emitting unit 110 and the second light emitting unit 120. The first light emitting unit 110 and the second light emitting unit 120 may be disposed in a vertical direction or disposed in parallel in a horizontal direction with respect to the ground. When the first light emitting unit 110 and the second light emitting unit 120 are disposed in the vertical direction, an upper region and a lower region may be sensed and measured with respect to the same direction, and when the first light emitting unit 110 and the second light emitting unit 120 are disposed in the horizontal direction, a left region and a right region may be sensed and measured with respect to the same height.

The light receiving unit 200 includes a condensing lens 210 configured to condense a laser beam reflected by a target object A and an image sensor 220 configured to receive the condensed laser beam from the condensing lens 210. In addition, the light receiving unit 200 includes a band pass filter (not shown) which is disposed between the condensing lens 210 and the image sensor 220 to transmit only a reflected laser beam in a wavelength range emitted from the light emitting units 110 and 120 and to not transmit beams in other wavelength ranges.

The light receiving unit 200 is formed between the first light emitting unit 110 and the second light emitting unit 120 and receives a first reflected laser beam R1 and a second reflected laser beam R2 which are respectively emitted from the first light emitting unit 110 and the second light emitting unit 120 and reflected by the target objects A on the optical axes.

In this case, as shown in FIGS. 2 and 3, the first reflected laser beam R1, which is emitted from the first light emitting unit 110 and is reflected and the second reflected light beam R2, which is emitted from the second light emitting unit 120 and is reflected, pass through the condensing lens 210 and are received by the image sensor 220. Due to a geometrical structure in which the first light emitting unit 110 and the second light emitting unit 120 are disposed in the vertical direction, the first reflected laser beam is received in an upper region of the image sensor 220, and the second reflected laser beam is received in a lower region of the image sensor 220. That is, a region of the image sensor 220, in which two reflected laser beams are received, is divided into the upper region and the lower region, and thus, a two-channel lidar sensor module capable of measuring two measurement regions may be implemented using one light receiving unit 200. Since a light receiving region of the image sensor 220 is divided, two reflected laser beams may be received without interfering with each other.

When the first light emitting unit 110 and the second light emitting unit 120 are disposed in the horizontal direction, due to a geometrical structure, the first reflected laser beam is received in a left region (or a right region) of the image sensor 220, and the second reflected laser beam is received in the right region (or the left region) of the image sensor 220.

Figure 4:
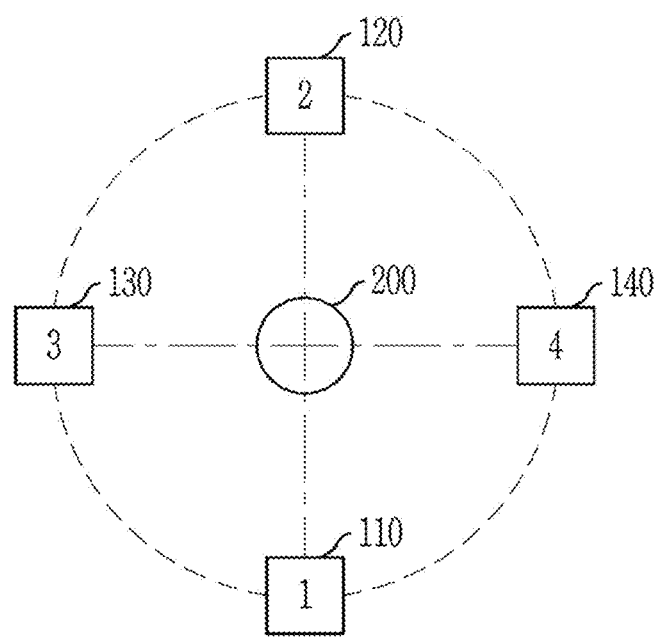
FIG. 4 is a view illustrating an application example of the multi-channel lidar sensor module according to the embodiment of the present invention.
Figure 5:
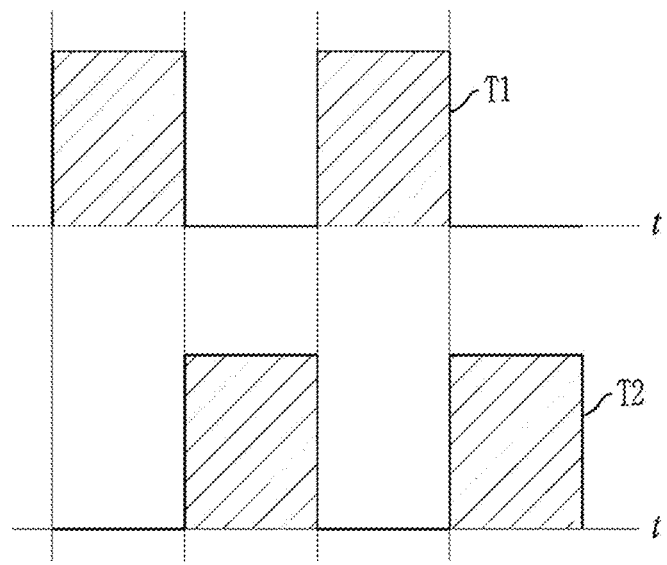
FIG. 5 is a graph showing an emission period in which a laser beam is emitted from a plurality of light emitting units.
Figure 6:
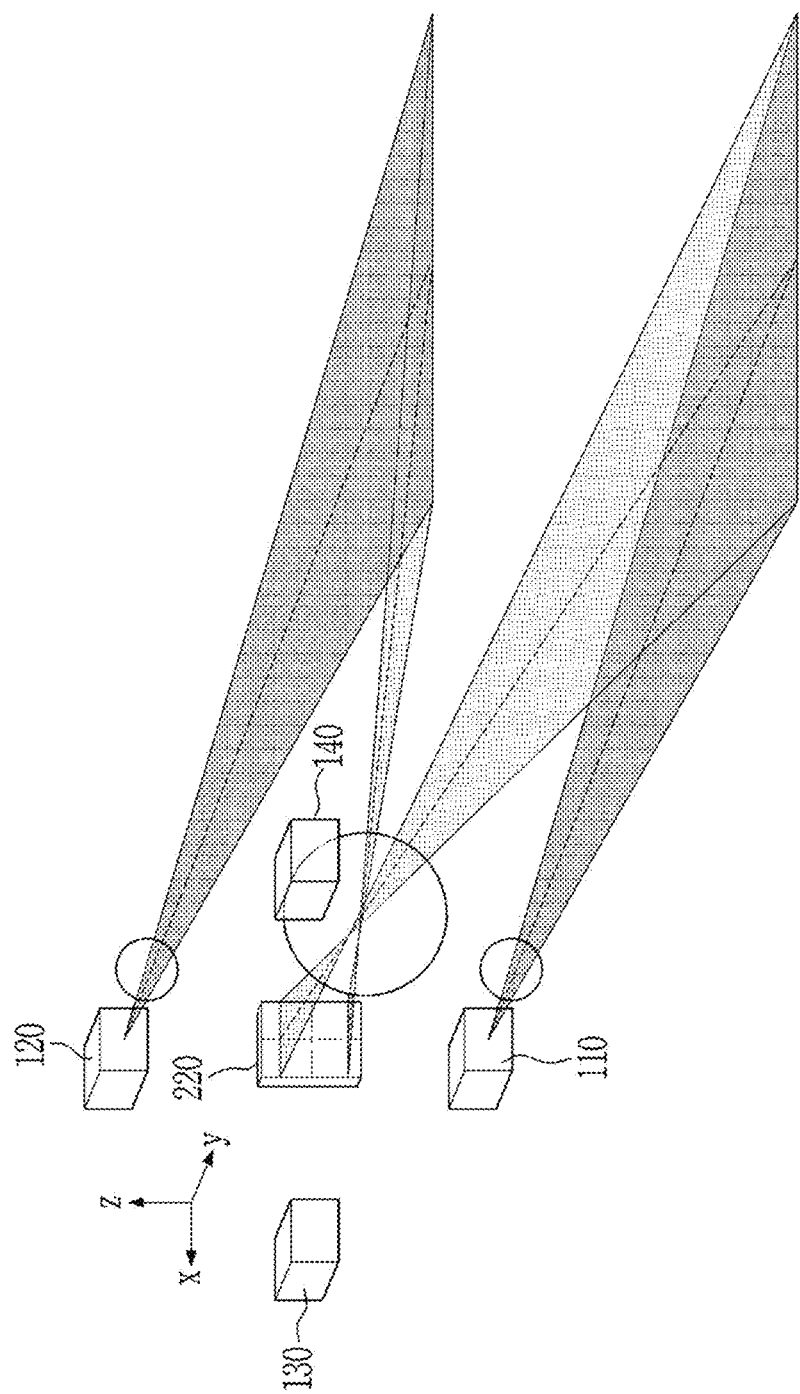
FIG. 6 is a view illustrating an operation state when an emission period is T1.
Figure 7:
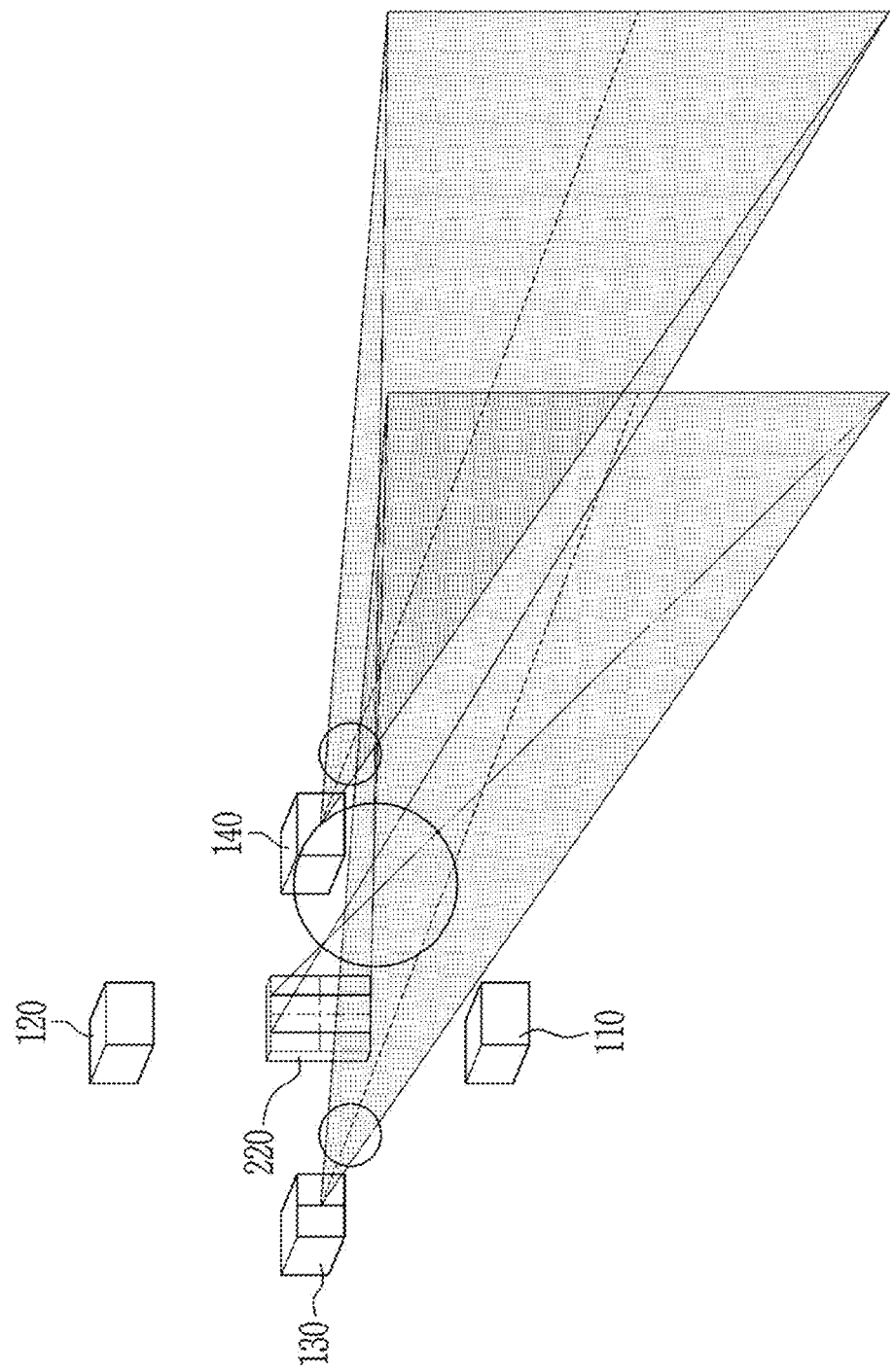
FIG. 7 is a view illustrating an operation state when an emission period is T2.

FIG. 4 is a view illustrating an application example of the multi-channel lidar sensor module according to the embodiment of the present invention. FIG. 5 is a graph showing an emission period in which a laser beam is emitted from a plurality of light emitting units. FIG. 6 is a view illustrating an operation state when an emission period is T1. FIG. 7 is a view illustrating an operation state when an emission period is T2. FIGS. 8 to 11 are views illustrating various application examples of the multi-channel lidar sensor module according to the embodiment of the present invention.

Hereinafter, the multi-channel lidar sensor module according to the embodiment of the present invention is not limited to two channels, and may be expanded to a plurality of channels.

For example, as shown in FIG. 4, one light receiving unit 200 may be disposed at a center, and first to fourth light emitting units 110 to 140 may be disposed at equal intervals on two imaginary lines orthogonal to each other with respect to a center point of the light receiving unit 200, thereby implementing a four-channel lidar sensor module.

In this case, since the first light emitting unit 110 and the second light emitting unit 120 have different light receiving regions in which light beams are received from an image sensor 220 and the third light emitting unit 130 and the fourth light emitting unit 140 have different light receiving regions in which light beams are received from the image sensor 220, the light beams may be received without interfering with each other. However, since the light receiving region of the first light emitting unit 110 overlaps the light receiving regions of the third and fourth light emitting units 130 and 140 and the light receiving region of the second light emitting unit 120 overlaps the light receiving regions of the third and fourth light emitting units 130 and 140, the light beams may interfere with each other. Thus, it may be difficult to perform accurate measurement.

Therefore, as shown in FIG. 5, a laser beam emission period T1 of the first light emitting unit 110 and the second light emitting unit 120 and a laser beam emission period T2 of the third light emitting unit 130 and the fourth light emitting unit 140 may be controlled so as to not overlap each other.

When an emission period is T1, only the first light emitting unit 110 and the second light emitting unit 120 may be operated, and the third light emitting unit 130 and the fourth light emitting unit 140 may not be operated. Thus, as shown in FIG. 6, the first light emitting unit 110 and the second light emitting unit 120 may measure upper and lower regions without being interfered with the third light emitting unit 130 and the fourth light emitting unit 140.

Similarly, when an emission period is T2, the first light emitting unit 110 and the second light emitting unit 120 may not be operated, and the third light emitting unit 130 and the fourth light emitting unit 140 may be operated. Thus, as shown in FIG. 7, the third light emitting unit 130 and the fourth light emitting unit 140 may measure left and right regions without being interfered with the first light emitting unit 110 and the second light emitting unit 120.

Figure 8:
FIGS. 8 to 11 are views illustrating various application examples of the multi-channel lidar sensor module according to the embodiment of the present invention.

In addition, as shown in FIG. 8, first to fourth light emitting units 110 to 140 are disposed at equal intervals in a vertical direction or a horizontal direction with respect to one light receiving unit 200, thereby implementing a four-channel lidar sensor module.

In this case, since the first light emitting unit 110 and the second light emitting unit 120 have different light receiving regions in which light beams are received from an image sensor 220 and the third light emitting unit 130 and the fourth light emitting unit 140 have different light receiving regions in which light beams are received from the image sensor 220, the light beams may be received without interfering with each other. However, since the light receiving region of the first light emitting unit 110 overlaps the light receiving region of the third light emitting unit 130 and the light receiving region of the second light emitting unit 120 overlaps the light receiving region of the fourth light emitting unit 140, the light beams may interfere with each other. Thus, it may be difficult to perform accurate measurement.

Even in this case, as shown in FIG. 5, the laser beam emission period T1 of the first light emitting unit 110 and the second light emitting unit 120 and the laser beam emission period T2 of the third light emitting unit 130 and the fourth light emitting unit 140 may be controlled so as to not overlap each other.

Figure 9:
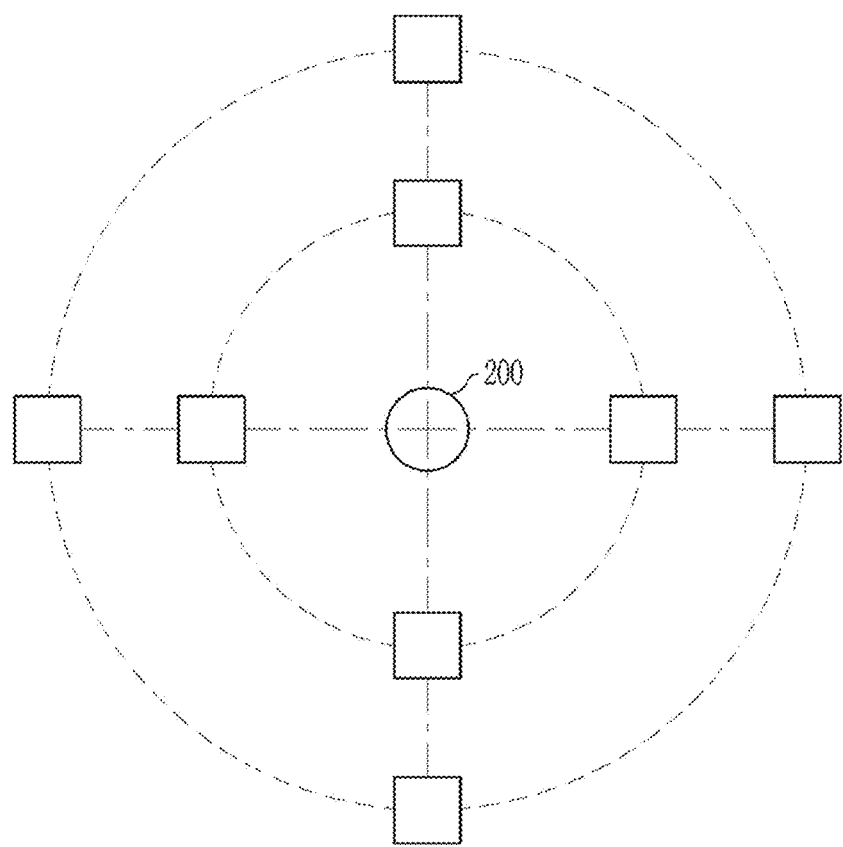
Figure 10:
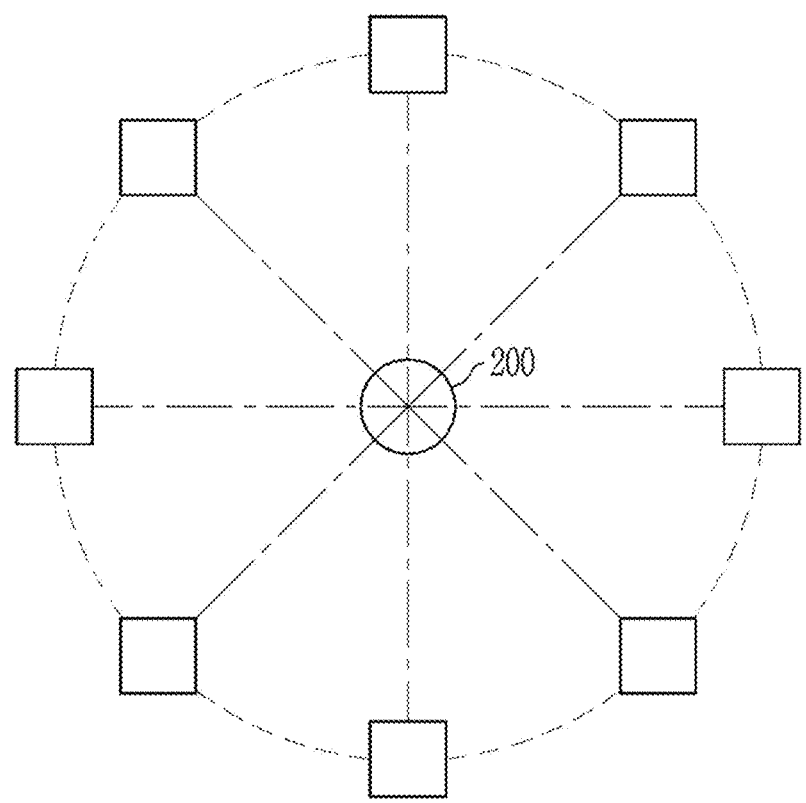

As described above, a plurality of pairs of light emitting units opposite to each other may be disposed around one light receiving unit 200, and emission periods of the pairs of light emitting units may be controlled to implement a multi-channel lidar sensor module. FIGS. 9 to 10 illustrate various application examples of the multi-channel lidar sensor module according to the embodiment of the present invention.

Figure 11:
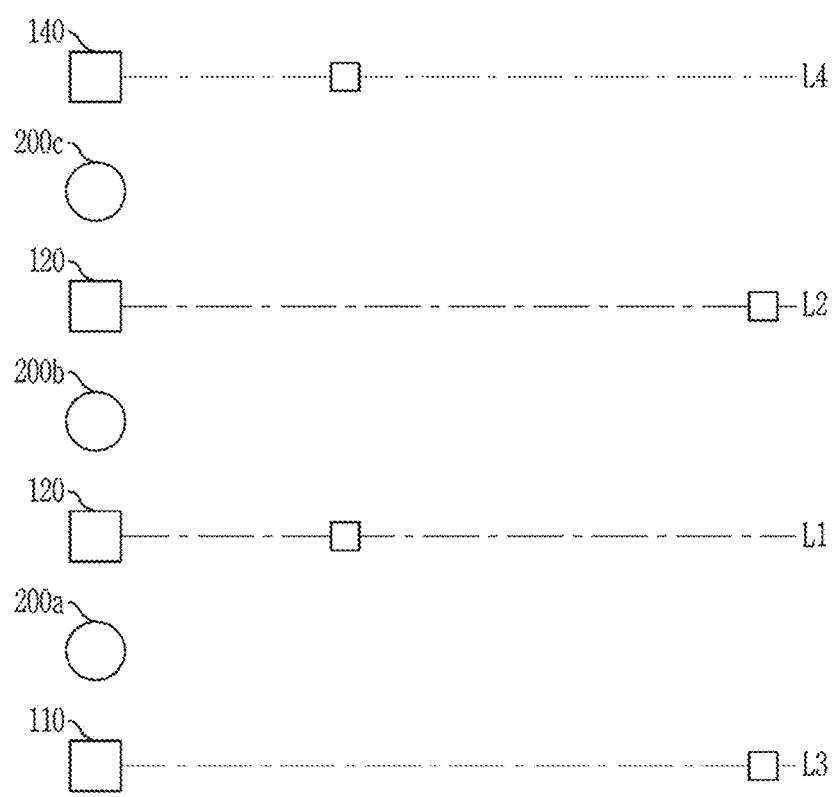

On the other hand, as shown in FIG. 11, the multi-channel lidar sensor module according to the embodiment of the present invention may be implemented as a multi-channel lidar sensor module which includes n light receiving units 200a to 200c and n+1 light emitting units 110 to 140. In this case, the light receiving unit and the light emitting unit may be alternately disposed in a vertical direction or a horizontal direction, and one light receiving unit may receive reflected laser beams which are emitted from two adjacent light emitting units and are reflected by target objects.

Here, when the n light receiving units 200a to 200c are concurrently operated, a reflected laser beam received by any one light receiving unit may be interfered with a reflected laser beam received by an adjacent light receiving unit.

Therefore, in order to prevent the reflected laser beams received by adjacent light receiving units from interfering with each other, as shown in FIG. 11, when the light receiving units 200a to 200c and the light emitting unit 110 to 140 are alternately disposed, the adjacent light receiving units may be controlled such that only any one light emitting unit thereof is operated.

For example, when the light receiving unit 200a is operated, the light receiving unit 200b may be controlled so as to not be operated, and the light receiving unit 200c may be controlled to be operated. Similarly, when the light receiving unit 200b is operated, the light receiving unit 200a and the light receiving unit 200c may be controlled so as to not be operated.

According to the multi-channel lidar sensor module according to the embodiment of the present invention as described above, it is possible to provide a multi-channel lidar sensor module including one light receiving unit and a plurality of light emitting units.

Therefore, it is possible to sense a plurality of target objects A and measure distances to the target objects A existing on a plurality of light source optical axes using one multi-channel lidar sensor module. The plurality of target objects A may be sensed/measured using one multi-channel lidar sensor module, thereby considerably reducing costs of purchasing a plurality of lidar sensor modules and solving a space problem caused by the plurality of lidar sensor modules.

Figure 12:
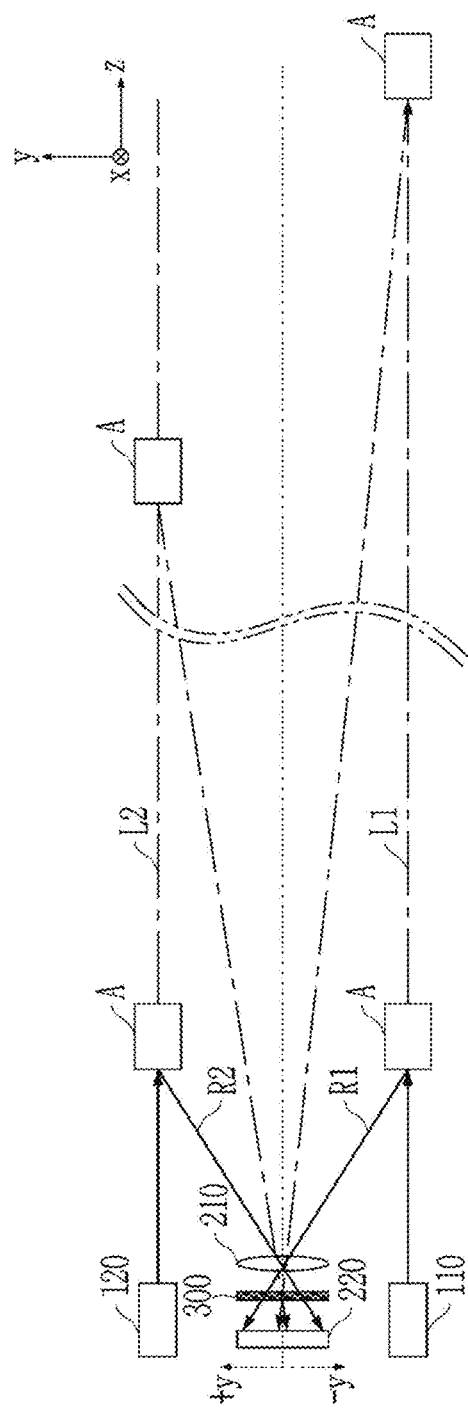
FIG. 12 is a view illustrating a multi-channel lidar sensor module according to another embodiment of the present invention.
Figure 13:
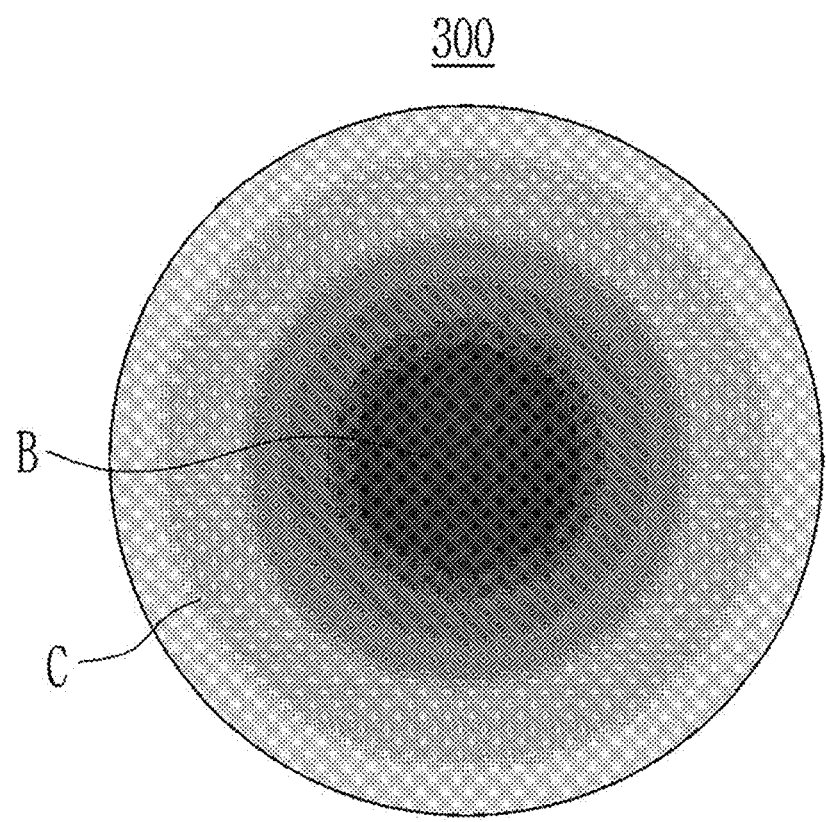
FIGS. 13 and 14 are views illustrating an optical filter unit of the multi-channel lidar sensor module according to another embodiment of the present invention.
Figure 14:
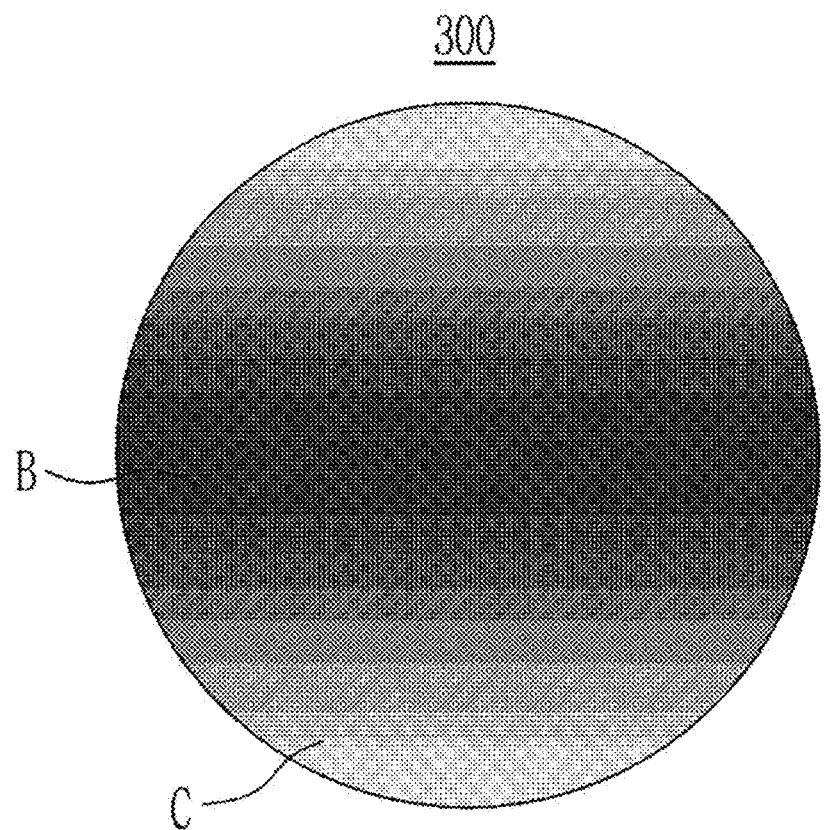

Next, a multi-channel lidar sensor module according to another embodiment of the present invention will be described with reference to FIGS. 12 to 14. FIG. 12 is a view illustrating the multi-channel lidar sensor module according to another embodiment of the present invention, and FIGS. 13 and 14 are views illustrating an optical filter unit of the multi-channel lidar sensor module according to another embodiment of the present invention.

As shown in FIG. 12, the multi-channel lidar sensor module according to another embodiment of the present invention includes a first light emitting unit 110, a second light emitting unit 120, a light receiving unit 200, and an optical filter unit 300. Since the first light emitting unit 110, the second light emitting unit 120, and the light receiving unit 200 are the same as those in the above-described embodiment, detailed descriptions thereof will be omitted.

The optical filter unit 300 controls transmittance of a reflected laser beam received by the light receiving unit 200 according to a distance to a target object A. The optical filter unit 300 may be composed of an optical film having a preset size and shape or may be formed to be applied on a surface of a band pass filter (not shown) or an image sensor 220.

When the optical filter unit 300 is composed of the optical film, a transmittance slope is formed on a surface of the optical film such that transmittance is adjusted according to a distance between the light emitting units 110 and 120 and the target object. That is, the transmittance slope is formed such that the transmittance is highest at a central portion B of the optical film and is gradually decreased in a direction from the central portion to a peripheral portion C of the optical film.

Even when the surface of the band pass filter or the image sensor 220 is formed to be coated with the optical filter unit 300, a coating material is applied such that a concentration of the coating material is non-uniform to form a transmittance slope as described above. That is, the coating material is applied such that the transmittance is highest at a central portion of the surface of the band pass filter or the image sensor 220, and the coating material is applied such that the transmittance is gradually decreased in a direction toward a peripheral portion of the surface.

In the optical filter unit 300, as shown in FIG. 13, a transmittance slope may be formed in a concentric shape, or as shown in FIG. 14, a transmittance slope may be formed in a linear shape. When laser beams emitted from the light emitting units 110 and 120 are line beams, the optical filter unit 300 may have the concentric shape as shown in FIG. 13. When the laser beams emitted from the light emitting units 110 and 120 are point beams, the optical filter unit 300 may have the linear shape shown in FIG. 14.

An operation of the multi-channel lidar sensor module according to another embodiment of the present invention as configured above will be described.

When a laser beam is transmitted (emitted) from the light emitting unit 110 or 120, the emitted laser beam is reflected by a target object (or an obstacle), the reflected laser beam is condensed by a condensing lens 210, and the condensed laser beam is received by the image sensor 220. The band pass filter may transmit only a reflected laser beam in a wavelength range emitted from the light emitting unit 110 or 120.

In this case, a transmittance slope is formed in the optical filter unit 300 such that transmittance is highest at a central portion thereof and is gradually decreased in a direction from the central portion to a peripheral portion thereof. Due to a geometrical structure, a laser beam reflected by a target object at a long distance passes through the central portion of the optical filter unit 300, and a laser beam reflected by a target object at a near distance passes through the peripheral portion.

Since the transmittance of the central portion is high, the laser beam reflected at the long distance has a small light amount but passes through the central portion so as to correspond to the high transmittance. Since the transmittance of the peripheral portion is low, the laser beam reflected at the near distance passes through the peripheral portion so as to correspond to the low transmittance.

Accordingly, a light amount of a laser beam received by the image sensor 220 may be uniformly maintained at a certain level due to a difference of the light amount according to a distance to a target object being minimized, thereby performing accurate measurement on both a near distance region and a long distance region.

Figure 15:
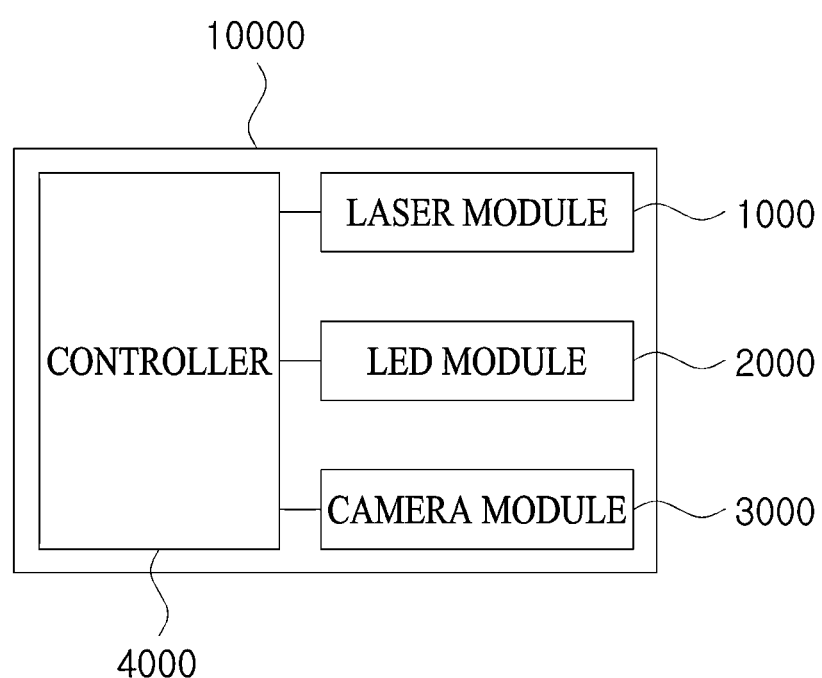
FIG. 15 is a block diagram illustrating an object information acquiring apparatus according to an embodiment of the present invention.

FIG. 15 is a block diagram illustrating an object information acquiring apparatus according to an embodiment of the present invention.

Referring to FIG. 15, an object information acquiring apparatus 10000 may include a laser module 1000, a light-emitting diode (LED) module 2000, a camera module 3000, and a controller 4000.

Hereinafter, each component of the object information acquiring apparatus 10000 will be described in detail.

The laser module 1000 may emit a laser beam toward an object.

The laser module 1000 may emit laser beams in various forms. For example, the laser module 1000 may emit a laser beam in a form of a line extending along one axis. Alternatively, the laser module 1000 may emit a laser beam in a form of a planar shape.

The laser module 1000 may include a light source unit 1100 and a scanning unit 1200.

The light source unit 1100 may generate a laser beam emitted from the laser module 1000.

The light source unit 1100 may be provided with various kinds of light sources. For example, the light source unit 1100 may be provided with a laser diode and a vertical cavity surface emitting laser (VCSEL).

The light source unit 1100 may be provided in various forms. For example, the light source unit 1100 may be provided with a plurality of laser diodes arranged in an array form.

The light source unit 1100 may generate laser beams having various wavelengths. For example, the light source unit 1100 may generate laser beams having wavelengths of 850 nm, 905 nm, and 1,550 nm.

The scanning unit 1200 may generate an emission beam using a laser beam generated from the light source unit 1100. For example, the scanning unit 1200 may generate a laser beam in a form of a line from a laser beam in a form of a point generated from the light source unit 1100.

The scanning unit 1200 may include various optical components. For example, the scanning unit 1200 may include a collimator configured to generate parallel light. Alternatively, the scanning unit 1200 may include a lens configured to diffuse a laser beam generated from the light source unit 1100 in a uniaxial or biaxial direction. In addition, the scanning unit 1200 may include a mirror configured to reflect a laser beam generated from the light source unit 1100 to form an emission direction of the laser beam. In addition, the scanning unit 1200 may include various optical components such as a metasurface including nanopillars.

The LED module 2000 may emit light toward the object.

The LED module 2000 may emit light beams having various wavelengths. For example, the LED module 2000 may emit light beams having wavelengths of 850 nm, 905 nm, and 1,550 nm.

The LED module 2000 may be provided in various forms. For example, the LED module 2000 may be provided with a plurality of LED elements arranged in an array form. Alternatively, the LED module 2000 may be provided with a plurality of LED elements arranged in an irregular form.

The camera module 3000 may photograph a periphery of the object information acquiring apparatus 10000. Accordingly, the camera module 3000 may acquire an image by photographing the periphery of the object information acquiring apparatus 10000.

The camera module 3000 may include a sensing unit 3100 configured to sense light and a light receiving lens 3200 configured to guide light to the sensing unit 3100.

The sensing unit 3100 may include various types of sensing elements. For example, the sensing unit 3100 may include a charge coupled device (CCD) and a complimentary metal oxide semiconductor (CMOS). Alternatively, the sensing unit 3100 may include a single-photon avalanche diode (SPAD) and a photodiode.

The sensing unit 3100 may be made of various materials. For example, the sensing unit 3100 may be made of silicon, germanium, or InGaAs. Accordingly, a wavelength band in which light receiving sensitivity of the sensing unit 3100 is maximized may be varied.

The sensing unit 3100 may generate an electrical signal using an optical signal.

The sensing unit 3100 may receive a laser beam that is emitted from the laser module 1000 and then reflected from an object. Accordingly, the sensing unit 3100 may acquire an image including the received laser beam.

The camera module 3000 may include a filter. The filter may be provided in various types. For example, the camera module 3000 may include an infrared filter and a visible light filter.

The camera module 3000 may include an optical shutter including an optical switch.

The controller 4000 may control each of the laser module 1000, the LED module 2000, and the camera module 3000.

The controller 4000 may control an emission timing, intensity, and a pulse rate of a laser beam emitted from the laser module 1000.

The controller 4000 may control an emission timing, intensity, and a pulse rate of light emitted from the LED module 2000.

The controller 4000 may control light receiving sensitivity of the camera module 3000. For example, the controller 4000 may control a gain value or a threshold value of the sensing unit 3100.

The controller 4000 may acquire an image captured by the camera module 3000 from the camera module 3000.

The controller 4000 may acquire type information related to an object included in the acquired image. For example, the controller 4000 may acquire the type information related to the object based on a pixel value of the acquired image.

The controller 4000 may acquire the type information related to the object through various methods. For example, the controller 4000 may acquire the type information based on a look-up table. Here, the look-up table may be provided based on the pixel value or intensity of the acquired image.

Alternatively, the controller 4000 may acquire the type information related to the object using an artificial neural network (NN) that is learned to perform an image recognizing operation.

Meanwhile, the controller 4000 may perform a preprocessing operation on the acquired image. For example, the preprocessing operation may include edge detection, blurring, sharpening, and red, green, and blue (RGB) normalization.

The controller 4000 may acquire the type information related to the object based on an image acquired through the preprocessing operation.

Meanwhile, although not shown, the object information acquiring apparatus 10000 may include a communication module. The controller 4000 may acquire the type information related to the object from an external server through the communication module. In this case, an operation for acquiring the type information related to the object may be performed in the server.

The controller 4000 may acquire distance information related to the object based on a laser beam that is emitted from the laser module 1000, reflected by the object, and then is received by the camera module 3000.

For example, the controller 4000 may acquire the distance information related to the object based on a position of the received laser beam on the image acquired from the camera module 3000. In this case, the controller 4000 may acquire the distance information related to the object in consideration of an installation position and a posture of the camera module 3000, an angle of the sensing unit 3100 from a ground, and the like.

Alternatively, the controller 4000 may acquire the distance information related to the object based on a reception time of the laser beam. Specifically, the controller 4000 may acquire the distance information related to the object based on a difference between an emission time at which a laser beam is emitted from the laser module 1000 and a reception time at which a laser beam is received by the camera module 3000.

In addition, the controller 4000 may acquire the distance information related to the object based on a phase difference between the laser beams. Specifically, the controller 4000 may acquire the distance information related to the object based on a phase difference between the laser beam emitted from the laser module 1000 and the laser beam received by the camera module 3000.

The controller 4000 may be provided as a micro controller unit (MCU) or a central processing unit (CPU). However, the present invention is not limited thereto, and the controller 4000 may be provided as various chips configured to perform an operation of acquiring the distance information, which is performed in the present invention.

Figure 16:
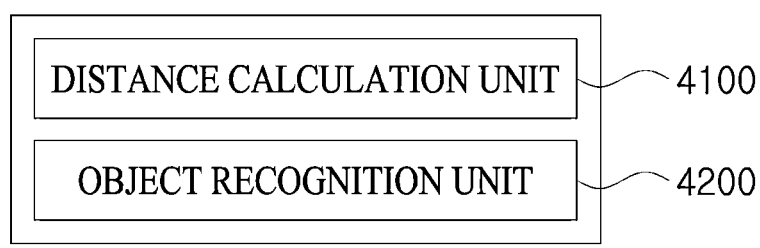
FIG. 16 is a block diagram illustrating a controller according to the embodiment.

FIG. 16 is a block diagram illustrating the controller according to the embodiment.

The controller 4000 may include a distance calculation unit 4100 and an object recognition unit 4200.

The distance calculation unit 4100 may calculate distance information related to an object through various methods. For example, the distance calculation unit 4100 may calculate the distance information related to the object based on a triangulation method. Alternatively, the distance calculation unit 4100 may calculate the distance information related to the object based on a time-of-flight (TOF) method, a phase shift (PS) method, and a frequency modulated continuous wave (FMCW) method.

The controller 4000 may acquire an image captured by the camera module 3000. For example, the controller 4000 may acquire a first image (including a laser) captured by the camera module 3000 at an emission timing of the laser module 1000 and a second image (not including a laser) captured by the camera module 3000 at a non-emission timing of the laser module 1000.

When the acquired image is the first image, the distance calculation unit 4100 may calculate distance information related to an object included in the first image based on a position at which a laser beam emitted from the laser module 1000 is received on the first image.

Specifically, the distance calculation unit 4100 may detect a pixel position of the received laser beam and may calculate a distance to the object based on the detected pixel position. The distance calculation unit 4100 may detect the pixel position of the laser beam based on a size of a pixel value of the first image. Alternatively, when a light intensity of a specific region is greater than a light intensity of other regions in the first image, the distance calculation unit 4100 may detect position information related to a pixel in a corresponding region.

On the other hand, the first image may be an image captured at the non-emission timing of the LED module 2000. Thus, accuracy of the distance information may be improved. This is because, when the pixel position of the laser beam is detected, light emitted from the LED module 2000 may become noise. That is, an image by light excluding the laser beam emitted from the laser module 1000 may become noise.

When the acquired image is the second image, the object recognition unit 4200 may acquire type information related to an object included in the second image based on a pixel value of the second image. For example, the object recognition unit 4200 may acquire the type information based on intensity of the second image. Alternatively, the object recognition unit 4200 may acquire the type information based on an RGB value of the second image.

On the other hand, the second image may be an image captured at the emission timing of the LED module 2000. Thus, accuracy of the type information may be improved. This is because the pixel value of the second image may be increased by the LED module 2000.

For example, at night, a size of an optical signal acquired by the sensing unit 320 may not be sufficient to recognize an object. In this case, an object recognition rate of the object recognition unit 4200 may be decreased. That is, accuracy of type information related to an object may be decreased.

Here, as the LED module 2000 emits light toward the object, the pixel value of the second image may be increased. Accordingly, the object recognition rate of the object recognition unit 4200 may be increased. That is, the accuracy of the type information related to the object may be increased.

Meanwhile, the object recognition unit 4200 may also acquire type information related to the object included in the first image based on the first image. However, in this case, accuracy of the type information may be decreased as compared with a case in which the type information is acquired based on the second image. This is because, when an object is detected, a laser beam emitted from the laser module 1000 may become noise.

The object recognition unit 4200 may acquire type information related to an object through various methods. For example, the object recognition unit 4200 may recognize the object using a learned artificial NN.

The artificial NN may include various NNs. For example, the artificial NN may include a convolution NN (CNN) that extracts features using a filter. Alternatively, the artificial NN may include a recurrent NN (RNN) that has a structure in which output of a node is fed back as input again. In addition, the artificial NN may include various types of NNs such as a restricted Boltzmann machine (RBM), a deep belief network (DBN), a generative adversarial network (GAN), and a relation network (RN).

The artificial NN may be learned through various methods. For example, the artificial NN may include supervised learning, unsupervised learning, reinforcement learning, and imitation learning. In addition, the artificial NN may be learned through various learning methods.

Figure 17:
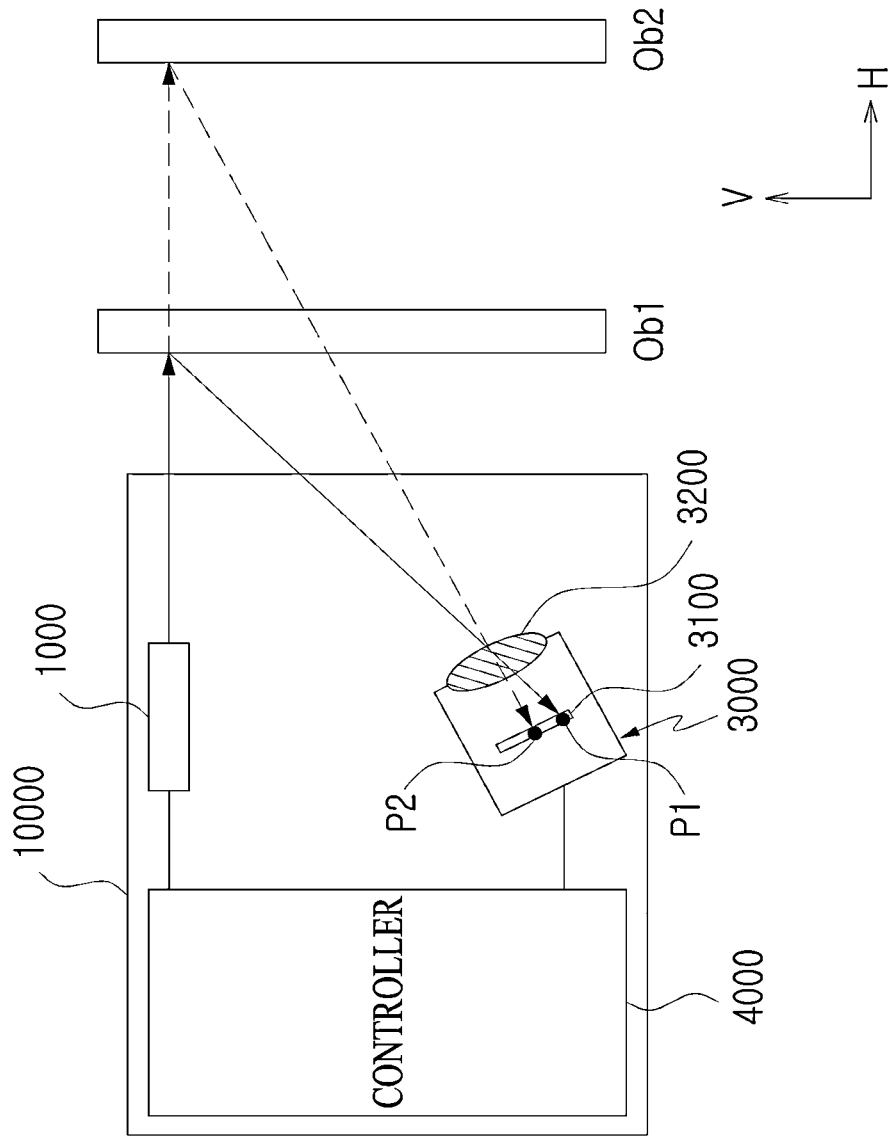
FIG. 17 is a diagram illustrating a method of acquiring distance information of the object information acquiring apparatus according to the embodiment.

FIG. 17 is a diagram illustrating a method of acquiring distance information of the object information acquiring apparatus according to the embodiment.

The laser module 1000 may emit laser beams to a first object Ob1 and a second object Ob2 farther away from the object information acquiring apparatus 10000 than the first object Ob1.

The camera module 3000 may acquire a first laser beam emitted from the laser module 1000 and then reflected from the first object Ob1 and a second laser beam emitted from the laser module 1000 and then reflected from the second object Ob2.

The first laser beam and the second laser beam may pass through the light receiving lens 3200 and then be received by the sensing unit 3100.

The controller 4000 may acquire coordinates of a first point P1 that is a position at which the first laser beam is received on the sensing unit 3100.

The controller 4000 may acquire distance information related to the first object Ob1 based on the coordinates of the first point P1. For example, the distance information may mean a distance from the laser module 1000 to the first object Ob1.

In this case, the controller 4000 may calculate the distance information related to the first object Ob1 in consideration of a distance between the laser module 1000 and the camera module 3000 in a direction of a perpendicular axis, an inclination angle of the sensing unit 3100 from the perpendicular axis, a distance between the sensing unit 3100 and the light receiving lens 3200, and a size of the sensing unit 3100.

As in the first object Ob1, the controller 4000 may calculate distance information related to the second object Ob2 based on coordinates of a second point P2 which is a position at which the second laser beam is received on the sensing unit 3100.

As shown in FIG. 17, the first point P1 may be farther away from the laser module 1000 than the second point P2. That is, as a position of a laser beam received on the sensing unit 3100 is moved farther away from the laser module 1000, a distance from an object reflecting the laser beam to the object information acquiring apparatus may be decreased.

Figure 18:
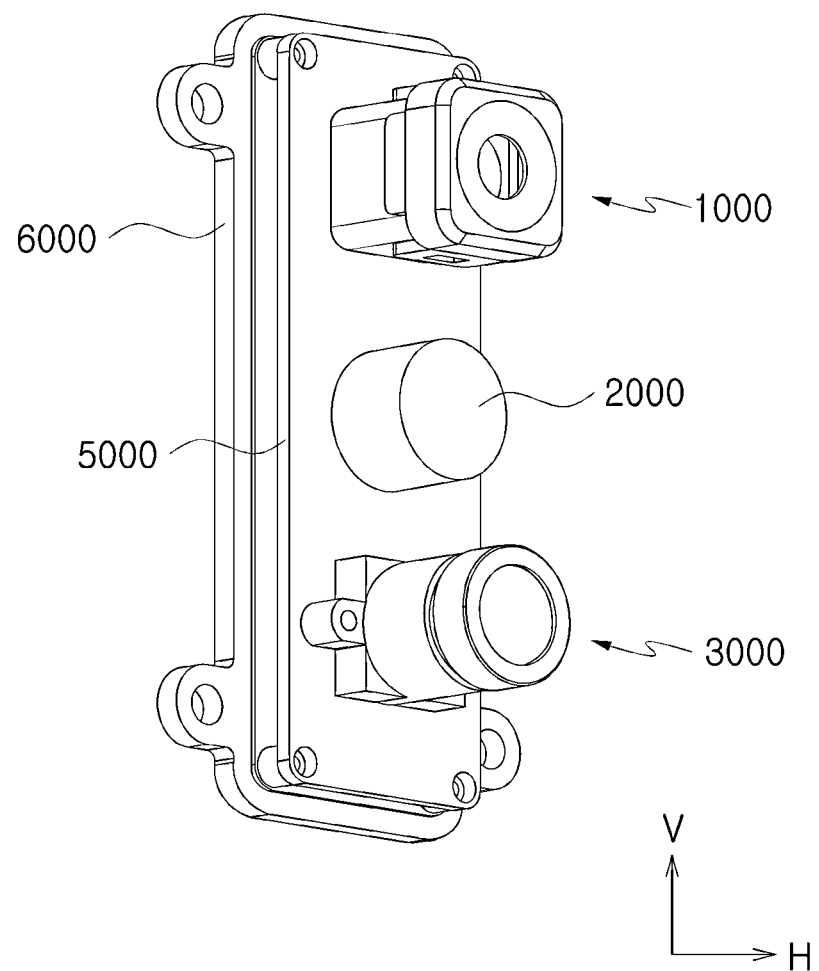
FIG. 18 is a stereoscopic diagram illustrating the object information acquiring apparatus according to the embodiment.

FIG. 18 is a stereoscopic diagram illustrating the object information acquiring apparatus according to the embodiment.

Referring to FIG. 18, the object information acquiring apparatus 10000 may include the laser module 1000, the LED module 2000, and the camera module 3000.

Meanwhile, the laser module 1000, the LED module 2000, and the camera module 3000 may be the same as or correspond to those described with reference to FIGS. 15 to 17. Therefore, detailed descriptions thereof will be omitted.

The object information acquiring apparatus 10000 may include a substrate 5000 having a flat plate shape and a base 6000 disposed parallel to the substrate 5000 and provided in a flat plate shape.

The substrate 5000 may be formed such that a length thereof along a longitudinal axis corresponding to a perpendicular axis V is greater than a length thereof along a lateral axis corresponding to a horizontal axis H The substrate 5000 may be bonded to the base 6000 so as to be parallel to the base 6000.

The base 6000 may have at least one connection groove.

When the object information acquiring apparatus 10000 is installed on a moving body, the object information acquiring apparatus 10000 may be installed on the moving body through the connection groove.

The laser module 1000 may be installed on the substrate 5000. For example, the laser module 1000 may be disposed to be spaced apart from the camera module 3000 in the direction of the perpendicular axis V.

The laser module 1000 may emit laser beams in various forms. For example, the laser module 1000 may emit a laser beam in a form of a line extending in the direction of the horizontal axis H.

The camera module 3000 may be installed on the substrate 5000. For example, the camera module 3000 may be disposed to be spaced apart from the laser module 1000 in the direction of the perpendicular axis V.

The LED module 2000 may be installed on the substrate 5000.

The LED module 2000 may be provided at various positions. For example, the LED module 2000 may be disposed between the laser module 1000 and the camera module 3000. In this case, the laser module 1000, the LED module 2000, and the camera module 3000 may be disposed on an imaginary straight line in the direction of the perpendicular axis.

Alternatively, the LED module 2000 may be disposed in a form which surrounds the camera module 3000.

Meanwhile, the LED module 2000 may be disposed closer to the camera module 3000 than the laser module 1000.

Figure 19:
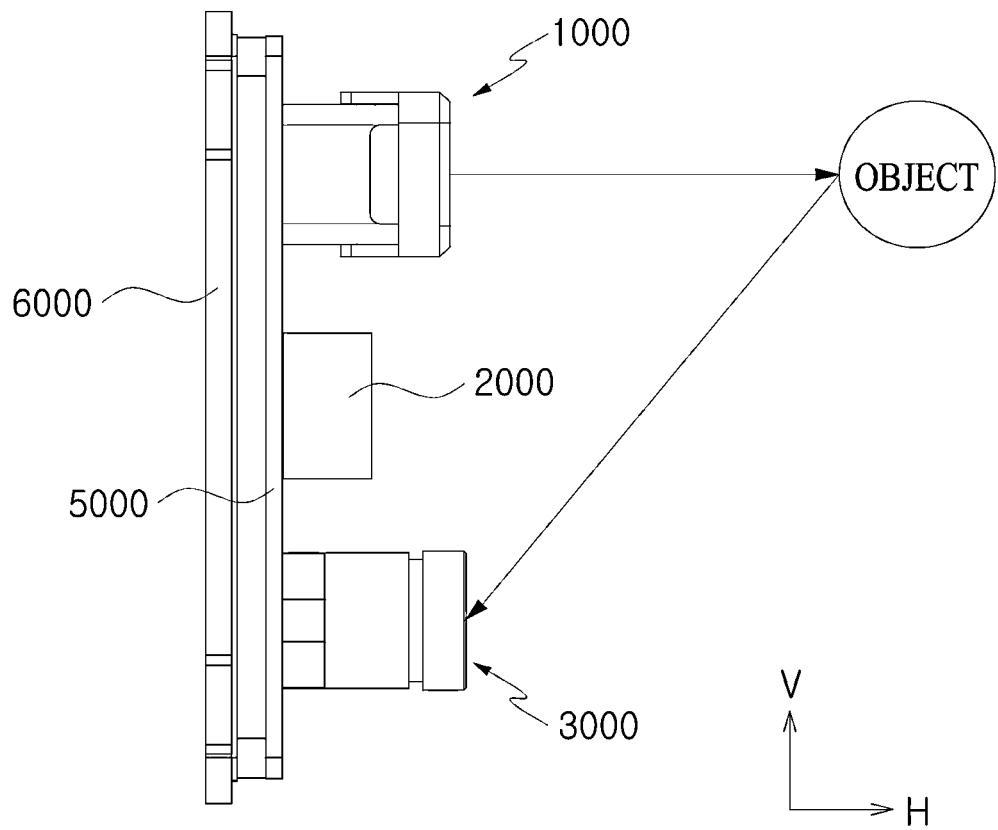
FIG. 19 is a side view illustrating the object information acquiring apparatus according to the embodiment.

FIG. 19 is a side diagram illustrating the object information acquiring apparatus according to the embodiment.

Referring to FIG. 19, an object information acquiring apparatus 10000 may include the laser module 1000, the LED module 2000, the camera module 3000, the substrate 5000, and the base 6000. In addition, although not shown, the object information acquiring apparatus 10000 may include the controller 4000.

Meanwhile, components of the object information acquiring apparatus 10000 may be the same as or correspond to those described with reference to FIGS. 15 to 18. Therefore, detailed descriptions thereof will be omitted.

The laser module 1000 may be disposed at an upper end of the substrate 5000.

The laser module 1000 may emit a laser beam in a form of a line. Specifically, the laser module 1000 may emit a laser beam in a form of a line extending along a reference axis perpendicular to the perpendicular axis V and the horizontal axis H.

Therefore, when viewed from the perpendicular axis V, the emitted laser beam may be formed in the form of the line perpendicular to the horizontal axis H. Similarly, when viewed from the horizontal axis H, the emitted laser beam may be formed in the form of the line perpendicular to the perpendicular axis V.

The light source unit 1100 may be installed perpendicular to the substrate 5000. Accordingly, the light source unit 1100 may emit a laser beam in a direction perpendicular to the substrate 5000.

In this case, the laser beam emitted from the light source unit 1100 may be reflected by the scanning unit 1200 and then emitted in the direction perpendicular to the substrate 5000. Here, the scanning unit 1200 may be provided as a mirror. The laser beam emitted from the light source unit 1100 may pass through a lens or a prism and then be emitted in the direction perpendicular to the substrate 5000.

On the other hand, the light source unit 1100 does not necessarily emit a laser beam in the direction perpendicular to the substrate 5000. For example, the light source unit 1100 may emit a laser beam in a direction parallel to the substrate 5000, and the scanning unit 1200 may refract the laser beam emitted in the parallel direction in the direction perpendicular to the substrate 5000. Accordingly, the laser beam emitted from the laser module 1000 may be emitted in the direction perpendicular to the substrate 5000 when viewed from a side thereof.

The camera module 3000 may be disposed at a lower end of the substrate 5000.

The camera module 3000 may receive a laser beam reflected from the object.

The camera module 3000 may include the sensing unit 3100 disposed in an array form in the direction of the perpendicular axis V. For example, the sensing unit 3100 may be provided with an avalanche photodiode (APD).

The light receiving lens 3200 may be disposed parallel to the substrate 5000. That is, the light receiving lens 3200 may be disposed such that a central axis of the light receiving lens 3200 is perpendicular to the substrate 5000.

Alternatively, the light receiving lens 3200 may be disposed such that the central axis of the light receiving lens 3200 is inclined from the horizontal axis H to the laser module 1000 when viewed from a side thereof.

The LED module 2000 may be disposed between the laser module 1000 and the camera module 3000.

The controller 4000 may acquire distance information related to the object based on a position at which the laser beam emitted from the laser module 1000 and then reflected from the object is received on the sensing unit 3100. Specifically, the controller 4000 may calculate the distance information related to the object based on a reception position of the received laser beam in the direction of the perpendicular axis V.

Meanwhile, the camera module 3000 is illustrated in FIG. 19 as directly receiving the laser beam reflected from the object, but the present invention is not limited thereto. For example, the camera module 3000 may also receive a laser beam that is emitted from the laser module 1000, reflected from the object, and then reflected from a mirror included in the object information acquiring apparatus 10000.

FIGS. 20 to 24 are diagrams illustrating an object information acquiring operation performed by the object information acquiring apparatus according to various embodiments.

Figure 20:
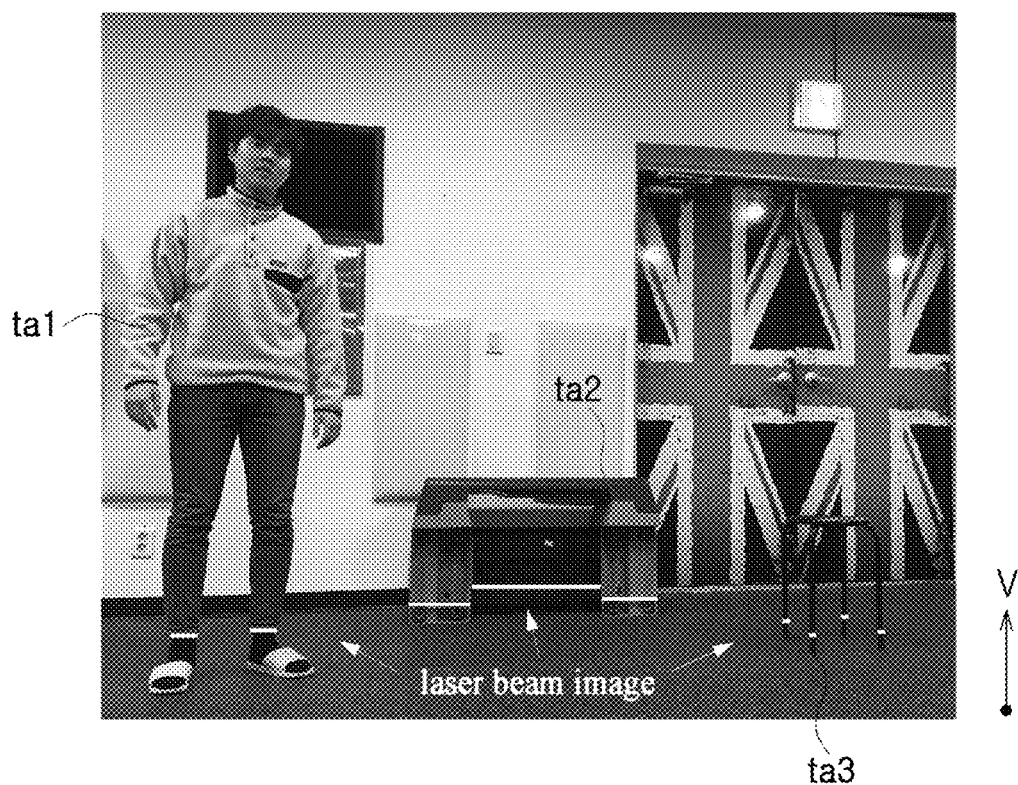
FIGS. 20 to 24 are diagrams illustrating an object information acquiring operation performed by the object information acquiring apparatus according to various embodiments.

Specifically, FIG. 20 shows a first image captured by the camera module 3000 at an emission timing of the laser module 1000. The emission timing may refer to a time point at which a laser beam is emitted from the laser module 1000.

The first image may include laser beam images corresponding to laser beams that are emitted from the laser module 1000, reflected from a plurality of targets ta1, ta2, and ta3, and then received by the camera module 3000.

The controller 4000 may acquire the first image.

The distance calculation unit 4100 may acquire distance information related to the target ta1, ta2, or ta3 included in the first image. The distance calculation unit 4100 may acquire the distance information based on a position of the laser beam image along a perpendicular axis on the first image.

For example, the distance calculation unit 4100 may detect a pixel position of the laser beam image. The distance calculation unit 4100 may calculate the distance information related to the target ta1, ta2, or ta3 based on the detected pixel position.

Meanwhile, the object recognition unit 4200 may acquire type information related to the target ta1, ta2, or ta3. For example, the object recognition unit 4200 may acquire the type information based on a pixel value of the first image. On the other hand, the contents described with reference to FIGS. 15 to 19 may be applied to a method of acquiring type information of the object recognition unit 4200, and thus, detailed descriptions thereof will be omitted.

The controller 4000 may classify the target ta1, ta2, or ta3 so as to have a predetermined classification value based on the acquired type information. For example, a first target ta1, i.e., a person, and a third target ta3, i.e., a chair, may be classified to have classification values corresponding to obstacles, and a second target ta2, i.e., a charging station, may be classified to have a separate classification value different from the classification values. Here, the second target ta2 may refer to an apparatus or place for charging a moving body equipped with the object information acquiring apparatus 10000.

The classification value corresponding to the obstacle may be reclassified according to characteristics thereof. For example, the classification value corresponding to the obstacle may be classified into various classification values according to a risk. Alternatively, the classification value corresponding to the obstacle may be classified according to whether the obstacle is a moving body. For example, the classification value of the first target ta1, i.e., a moving body, may be different from the classification value of the third target ta3, i.e., a fixed object.

On the other hand, since it is impossible to recognize an object using a conventional distance measurement sensor, there is a problem in that it is impossible for a moving body mounted with the distance measurement sensor to travel accurately. For example, when the distance measurement sensor is mounted on an automatic guided vehicle (AGV) or a robot cleaner, the second target ta2 of the first image is detected as an obstacle, and thus, the AGV or the robot cleaner may bypass the second target ta2 entirely.

In addition, there is a problem in that it is impossible to accurately measure a distance with respect to an object using a conventional image sensor.

On the other hand, the object information acquiring apparatus 10000 may acquire not only accurate distance information but also type information related to the target ta1, ta2, or ta3. Accordingly, when the object information acquiring apparatus 10000 is installed in the AGV or the robot cleaner, it is possible for the AGV or the robot cleaner to travel efficiently.

For example, the AGV equipped with the object information acquiring apparatus 10000 may not recognize the second target ta2 as an obstacle such as to bypass the second target ta2 entirely but may enter the second target ta2 based on the type information related to the second target ta2. Thus, the AGV may be recharged in the second target ta2.

The controller 4000 may generate a travelling control signal for controlling traveling of the moving body equipped with the object information acquiring apparatus 10000 based on acquired object information. For example, when an obstacle around the moving body is detected, the controller 4000 may generate a traveling signal to allow the moving body to bypass the obstacle.

On the other hand, it may be impossible to efficiently generate a traveling signal using a conventional one-dimensional distance measurement sensor. For example, when the distance measurement sensor senses the first target ta1, a moving body mounted with the distance measurement sensor may recognize two feet or legs of the first target ta1 as a separate obstacle. Accordingly, when a width of the moving body mounted with the distance measurement sensor is less than a distance between the two feet of the first target ta1, a traveling signal to allow the moving body to pass between the two feet of the first target ta1 may be generated. The generated traveling signal is a traveling signal generated without regard to the characteristics or type of the first target ta1. Thus, there may be a problem in that the moving body collides with the first target ta1 when the first target ta1 moves.

On the other hand, the object information acquiring apparatus 10000 may acquire the type information related to the first target ta1, and thus, the controller 4000 may generate a traveling signal to allow the object information acquiring apparatus 10000 to bypass the first target ta1 without passing between the two feet of the first target ta1 based on the type information.

In addition, the object information acquiring apparatus 10000 may generate a traveling signal of the moving body in consideration of a height, width, and size of an object included in an image acquired through the camera module 3000.

On the other hand, when the object recognition unit 4200 calculates distance information based on the laser beam image, the remaining image of the first image excluding the laser beam image may become noise. The remaining image may refer to a reflection image.

Thus, in order to improve accuracy of the distance information, the controller 4000 may acquire a second image in which intensity of the noise is reduced from the first image.

Figure 21:
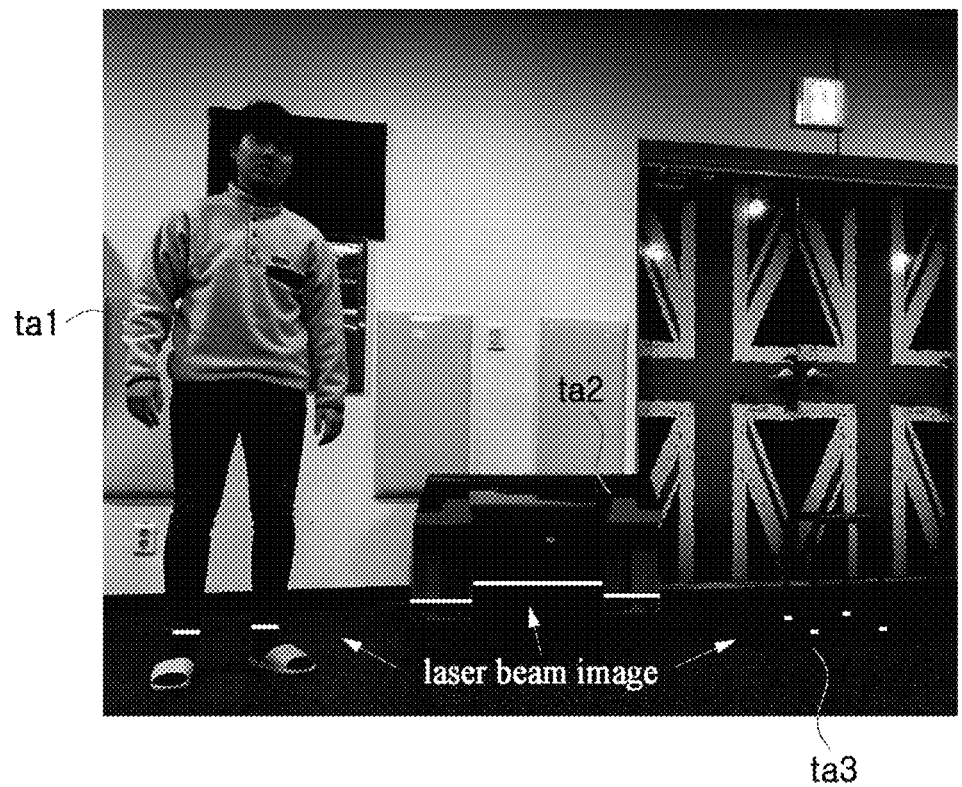

FIG. 21 is a diagram shows the second image.

For example, the controller 4000 may generate the second image using the first image by adjusting a threshold value of the sensing unit 3100.

Alternatively, the controller 4000 may generate the second image using the first image by blurring the remaining image in the first image As shown in FIG. 20, the distance calculation unit 4100 may acquire distance information related to the target ta1, ta2, or ta3 included in the second image.

Accuracy of second distance information acquired from the second image may be greater than accuracy of first distance information acquired from the first image.

Meanwhile, the controller 4000 may acquire a third image captured by the camera module 3000 at a non-emission timing of the laser module 1000. The non-emission timing may refer to a time point at which a laser beam is not emitted from the laser module 1000.

Figure 22:
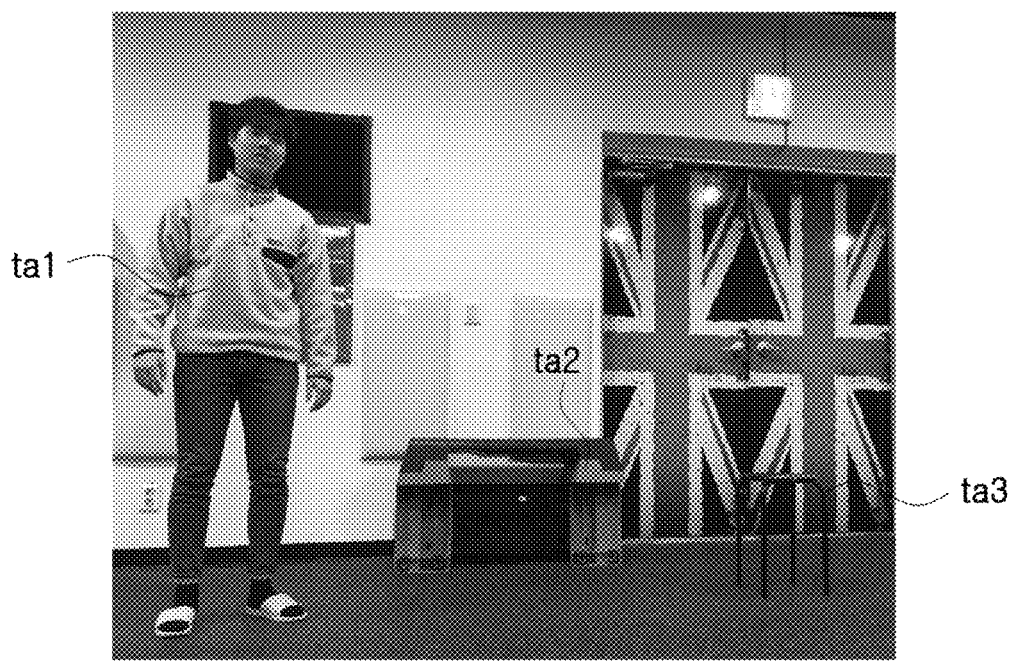

FIG. 22 is a diagram showing the third image.

As shown in FIG. 22, the third image may not include the laser beam image.

The controller 4000 may acquire the third image.

The object recognition unit 4200 may acquire type information related to each of the target ta1, ta2, and ta3 included in the third image. For example, the object recognition unit 4200 may acquire the type information based on a pixel value of the third image. Meanwhile, the contents described with reference to FIG. 20 may be applied to a method of acquiring type information of the object recognition unit 4200, and thus, detailed descriptions thereof will be omitted.

On the other hand, accuracy of third distance information acquired based on the third image may be greater than the accuracy of the first distance information calculated based on the first image. This is because, when the object recognition unit 4200 acquires the type information related to the target ta1, ta2, or ta3, the third image does not include the laser beam image that may become noise.

On the other hand, when a pixel value of an image captured from the camera module 3000 is insufficient due to a surrounding environment (for example, a weather situation), the accuracy of the type information may be decreased.

The controller 4000 may operate the LED module 2000 to improve the accuracy of the type information.

The controller 4000 may acquire a fourth image captured by the camera module 3000 at a non-emission timing of the laser module 1000 and an emission timing of the LED module 2000. The non-emission timing of the laser module 1000 may refer to a time point at which a laser beam is not emitted from the laser module 1000. In addition, the emission timing of the LED module 2000 may refer to a time point at which light is not emitted from the LED module 2000.

Figure 23:
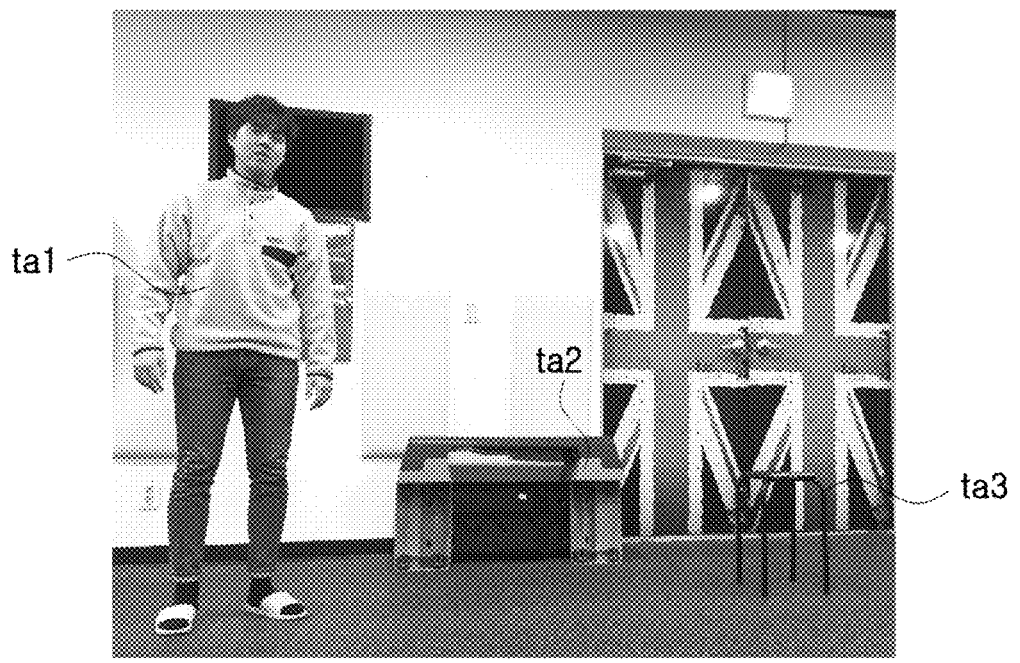

FIG. 23 is a diagram showing the fourth image.

A pixel value of the fourth image may be larger than that of the third image.

The fourth image may be an image with an increased pixel value. Alternatively, the fourth image may be an image with increased brightness.

The object recognition unit 4200 may acquire type information related to a target ta1, ta2, or ta3 included in the fourth image based on the fourth image.

Accordingly, accuracy of fourth type information acquired from the fourth image may be greater than the accuracy of the third type information acquired from the third image.

On the other hand, the controller 4000 may acquire a fifth image in which only edges of the targets ta1, ta2, and ta3 remain from the third image or the fourth image.

Figure 24:
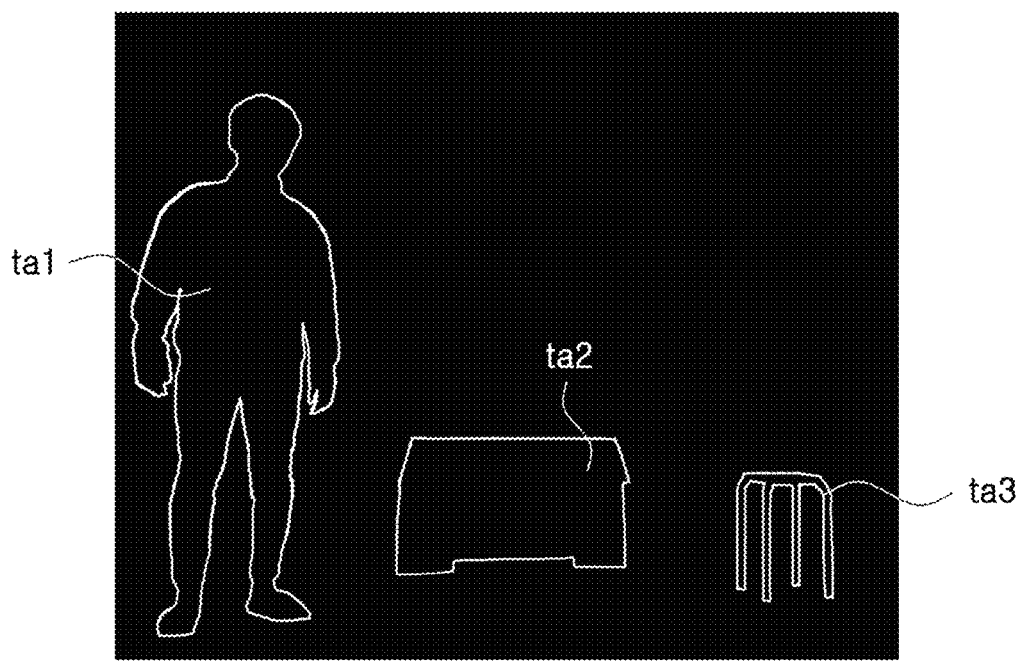

FIG. 24 is a diagram showing the fifth image.

The controller 4000 may detect edges of the targets included in the third image based on the pixel value of the third image. The controller 4000 may acquire the fifth image based on the detected edges.

Similarly, the controller 4000 may detect edges of the targets included in the fourth image based on the pixel value of the fourth image. The controller 4000 may acquire the fifth image based on the detected edges.

The object recognition unit 4200 may acquire type information related to the target ta1, ta2, or ta3 based on the fifth image.

Accordingly, accuracy of the type information acquired from the object recognition unit 4200 may be improved.

On the other hand, in FIGS. 20 to 24, a wavelength band at which light receiving sensitivity of the sensing unit 3100 is maximized may be an infrared band. That is, each of the first to fifth images may be an image acquired by an infrared sensor. In this case, the object information acquiring apparatus 10000 may include an optical filter which transmits only light corresponding to a wavelength band of a laser beam emitted from the laser module 1000 and blocks light having other wavelength bands.

Alternatively, the wavelength band at which the light receiving sensitivity of the sensing unit 3100 is maximized may be a visible light band. That is, the first to fifth images may be images acquired by a visible light sensor. In this case, the object information acquiring apparatus 10000 may include an optical filter which transmits only light corresponding to the visible light band and blocks light having other wavelength bands.

The method of acquiring the object information performed by the controller 4000 has been described above.

The object information acquired by the controller 4000 may be displayed on an external display communicating with the object information acquiring apparatus 10000 through various methods.

Figure 25:
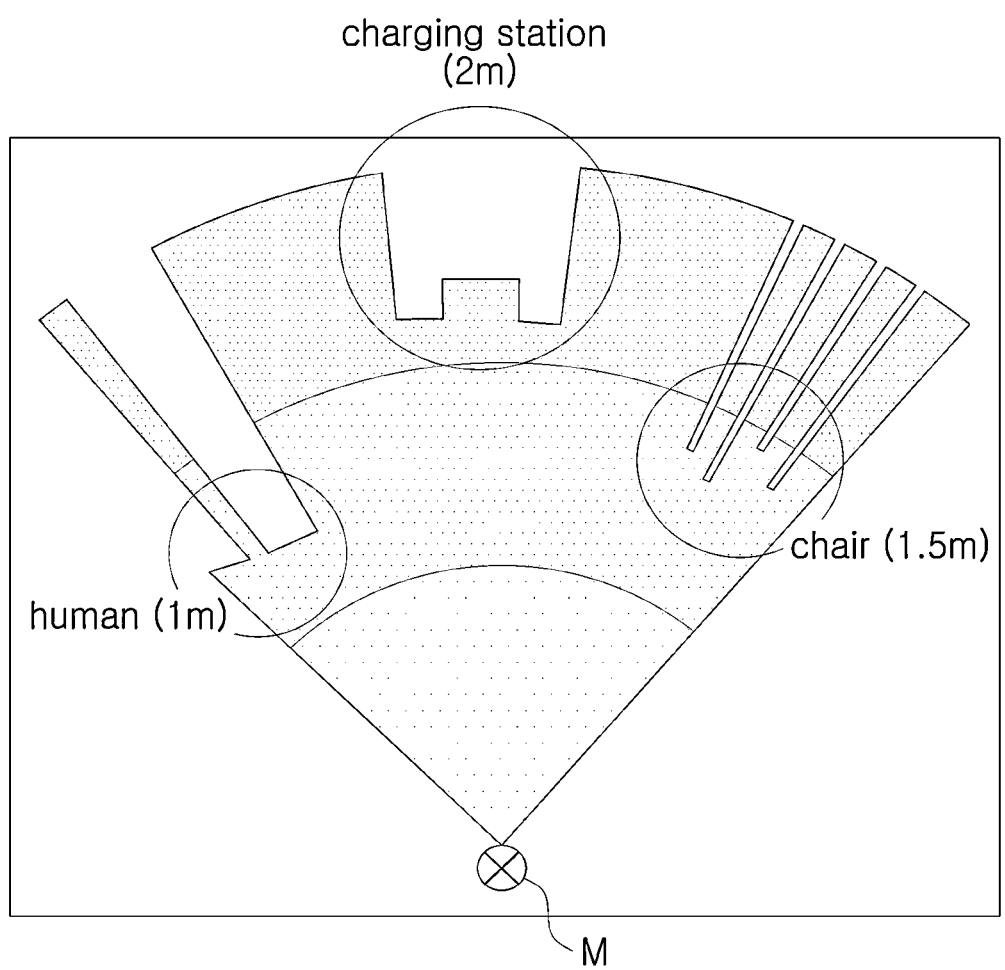
FIG. 25 is an image showing a display on which object information is displayed according to an embodiment.

FIG. 25 is an image showing a display on which object information is displayed according to an embodiment.

Figure 26:
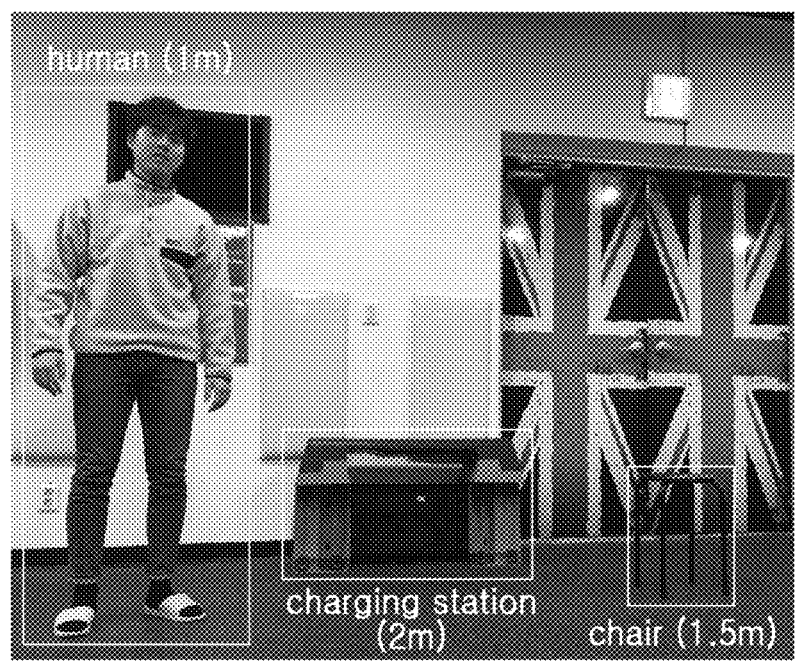
FIG. 26 is an image showing a display on which object information is displayed according to another embodiment.

The display may output an image including object information acquired by the controller 4000. For example, the display may output an around view with respect to a moving body M as shown in FIG. 26. The object information acquiring apparatus 10000 may be installed in the moving body M. The display may be installed on the moving body M.

The around view image may be expressed differently according to a distance from the moving body M. For example, a distance of an object may be classified into a short distance, a medium distance, and a long distance, which have a certain range. The around view image may be displayed in different colors according to the classified distances.

The display may display distance information and type information related to the object so as to be displayed at a position of the object on the around view image. For example, the distance information and the type information may be displayed so as to be written in the forms of numerals and characters at the position of the object on the around view image.

The around view image may be generated by the controller 4000. Alternatively, the around view image may be generated by other devices communicating with the object information acquiring apparatus 10000.

A type of and distance from an object around the moving body M may be displayed on an image output through the display.

In another example, the display may output object information based on an image acquired by the camera module 3000.

FIG. 26 is an image showing a display on which object information is displayed according to another embodiment.

The display may output an image including object information acquired by the controller 4000. For example, the display may output object information based on an image acquired by the camera module 3000 at a non-emission timing of the laser module 1000.

The display may output an image, on which distance information and type information related to an object around the object information acquiring apparatus 10000 are displayed, on the image acquired by the camera module 3000.

On the other hand, the controller 4000 may control emission timings of the laser module 1000 and the LED module 2000.

Figure 27:
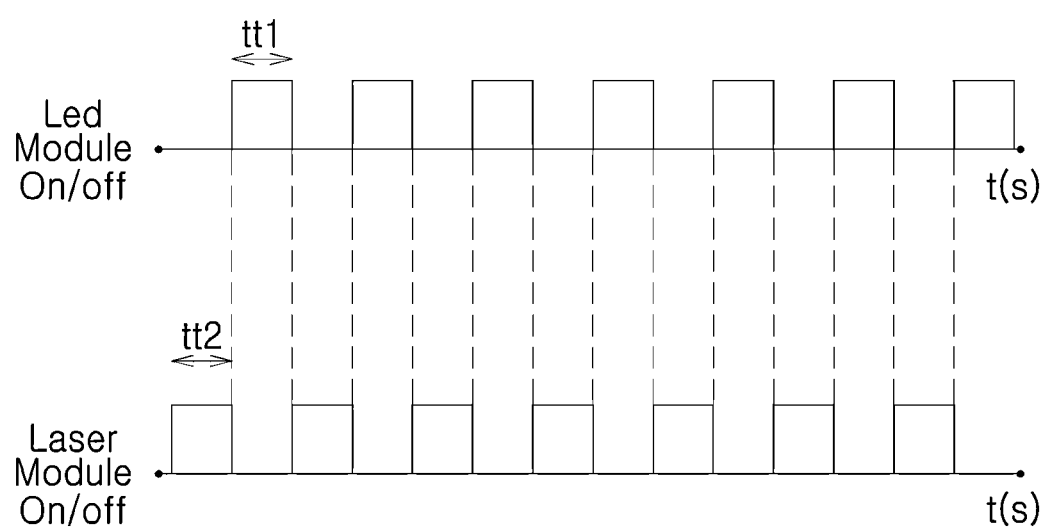
FIG. 27 is a diagram illustrating a control of emission timings of a laser module (100) and a light-emitting diode (LED) module (2000).

FIG. 27 is a diagram illustrating a control of the emission timings of the laser module 1000 and the LED module 2000.

The controller 4000 may control the emission timing of the laser module 1000. For example, when the LED module 2000 does not emit light, the controller 4000 may control the laser module 1000 to emit a laser beam. That is, while the LED module 2000 emits light, the controller 4000 may control the laser module 1000 to not emit a laser beam.

This is because, when the distance calculation unit 4100 calculates distance information based on a laser beam emitted from the laser module 1000, light emitted from the LED module 2000 may become noise.

The controller 4000 may control the emission timing of the LED module 2000. For example, when the laser module 1000 does not emit a laser beam, the controller 4000 may control the LED module 2000 to emit light. This is because, when the object recognition unit 4200 performs a type information acquiring operation, a laser beam emitted from the laser module 1000 may become noise.

A first period tt1 which is a duration time during which the laser module 1000 outputs a laser beam may be different from a second period tt2 which is a duration time during which the LED module 2000 emits light. For example, the first period tt1 may be less than the second period tt2. This is because power consumption for emitting the laser beam of the laser module 1000 may be higher than power for emitting the light of the LED module 2000.

The number of instances of laser beam emission of the laser module 1000 during one frame may be different from the number of instances of light emission of the LED module 2000 during one frame. For example, the number of instances of the laser beam emission may be greater than the number of instances of the light emission. Alternatively, the number of instances of the light emission may be greater than the number of instances of the laser beam emission.

On the other hand, an emission timing of the laser module 1000 and an emission timing of the LED module 2000 may overlap each other. That is, at the same time point, a laser beam may be emitted from the laser module 1000, and light may be emitted from the LED module 2000. In this case, the controller 4000 may acquire distance information and type information related to an object included in an image based on the image captured at the same time by the camera module 3000. The controller 4000 may increase a threshold value of the sensing unit 3100 to remove ambient light as well as noise.

Figure 28:
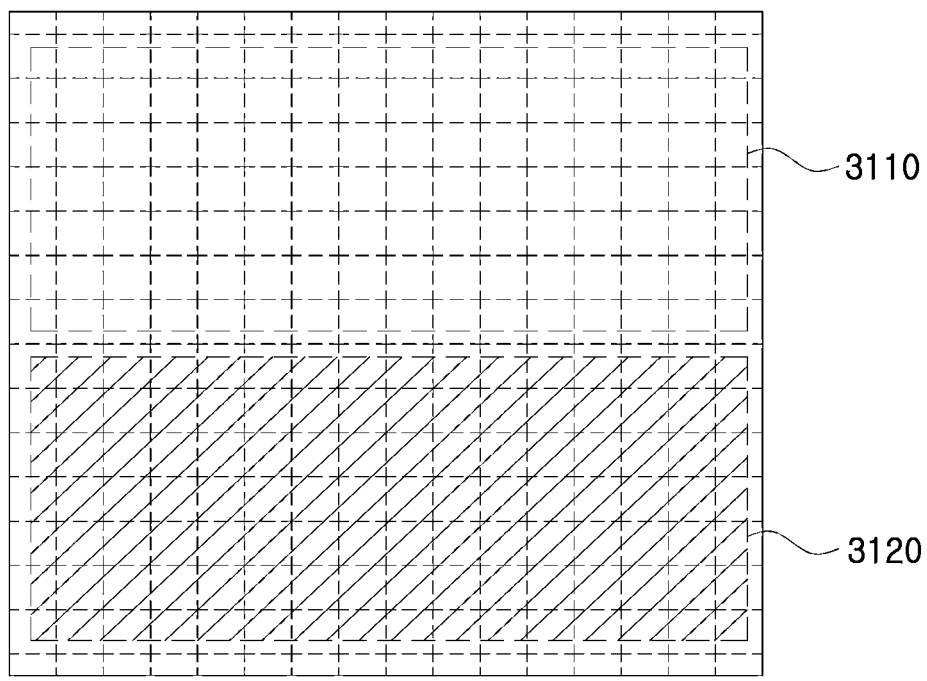
FIG. 28 is a diagram illustrating a sensing unit (3100) according to the embodiment.

On the other hand, as shown in FIG. 28, the sensing unit 3100 may be divided into a first region and a second region. For example, a first sensor 3110 configured to acquire a reflection image may be provided in the first region, and a second sensor 3120 configured to acquire a laser beam image may be provided in the second region.

Light receiving sensitivity of the first sensor according to a wavelength may be different from light receiving sensitivity of the second sensor according to a wavelength. For example, the light receiving sensitivity of the first sensor may be maximized in a visible light band, and the light receiving sensitivity of the second sensor may be maximized in an infrared band.

The first sensor may include an infrared ray (IR) filter for blocking an infrared ray. The second sensor may include a filter for blocking visible light.

The controller 4000 may control a time during which the sensing unit 3100 is exposed to light. For example, the controller 4000 may control a shutter of the camera module 3000 such that the sensing unit 3100 is exposed at an emission timing at which the laser module 1000 emits a laser beam.

The controller 4000 may control an exposure time of each of the first sensor 3110 and the second sensor 3120. For example, the controller 4000 may control the camera module 3000 such that the second sensor 3120 is exposed at the emission timing at which the laser module 1000 emits the laser beam. Alternatively, the controller 4000 may control the camera module 3000 such that the first sensor 3110 is exposed at an emission timing at which the LED module 2000 emits light.

Meanwhile, the controller 4000 may perform a type information acquiring operation based on distance information related to an object or may perform a distance information acquiring operation based on type information related to the object.

Figure 29:
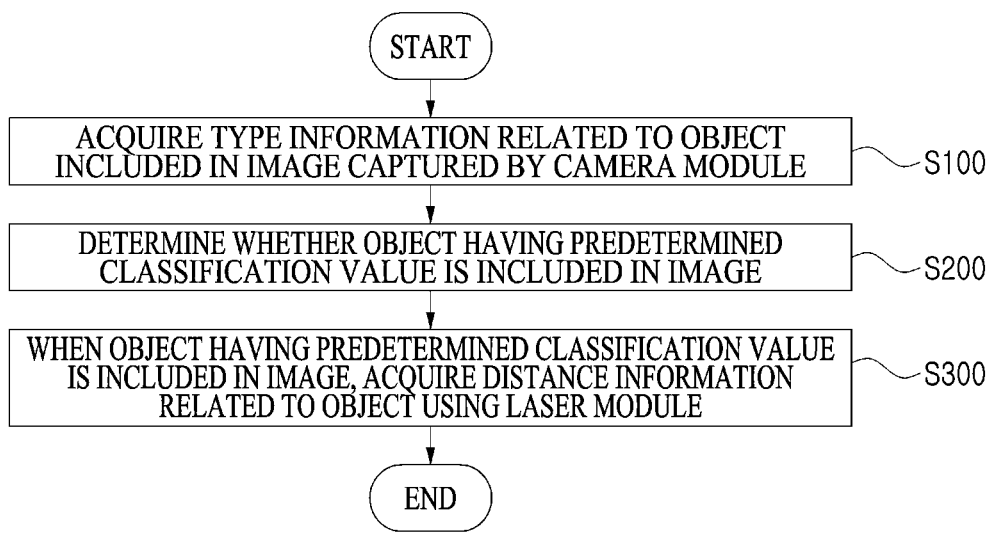
FIG. 29 is a flowchart illustrating a method of acquiring object information according to an embodiment.

FIG. 29 is a flowchart illustrating a method of acquiring object information according to an embodiment.

The method of acquiring the object information may include acquiring type information related to an object included in an image captured by a camera module (S100), determining whether an object having a predetermined classification value is included in the image (S200), and when the object having the predetermined classification value is included in the image, acquiring distance information related to the object using a laser module (S300).

First, an object recognizing unit 420 may acquire type information related to the object included in the image captured by the camera module 3000 (S100). The acquiring of the type information may be performed in the same manner as the method of acquiring the type information described with reference to FIGS. 15 to 28, and thus, detailed descriptions thereof will be omitted.

A controller 4000 may determine whether the object having the predetermined classification value is included in the image (S200). For example, the predetermined classification value may refer to a classification value corresponding to an obstacle. Alternatively, the predetermined classification value may refer to a classification value corresponding to a charging station. The predetermined classification value may be set by a user.

When the object having the predetermined classification value is included in the image, a distance calculation unit 4100 may calculate the distance information related to the object using the laser module 1000 (S300). Specifically, the distance calculation unit 4100 may calculate the distance information based on an image including a laser beam emitted from the laser module 1000, wherein the image is acquired by the camera module 3000. Meanwhile, a method of acquiring the distance information may be performed in the same manner as the method of acquiring the distance information described with reference to FIGS. 15 to 28, and thus, detailed descriptions thereof will be omitted.

For example, only when an object corresponding to an obstacle is included in the image, the controller 4000 may operate the laser module 1000 to calculate distance information related to the object. Accordingly, the controller 4000 may prevent energy consumption for outputting an unnecessary laser beam in an obstacle-free environment. In addition, it is possible to reduce a calculation time of acquiring object information of an object information acquiring apparatus 10000.

Figure 30:
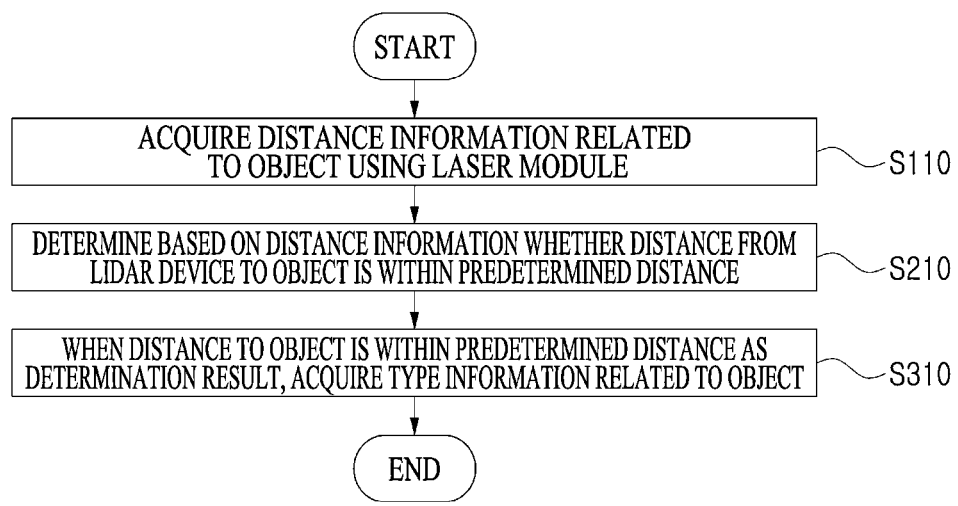
FIG. 30 is a flowchart illustrating a method of acquiring object information according to another embodiment.

FIG. 30 is a flowchart illustrating a method of acquiring object information according to another embodiment.

The method of acquiring the object information may include acquiring distance information related to an object using a laser module (S110), determining, based on the distance information, whether a distance from a lidar device to the object is within a predetermined distance (S210), and when the distance to the object is within the predetermined distance as a determination result, acquiring type information related to the object (S310).

First, a controller 4000 may acquire the distance information related to the object using the laser module 1000 (S110). Specifically, a distance calculation unit 4100 may calculate distance information related to an object included in an image based on the image acquired at an emission timing of the laser module 1000. Meanwhile, a method of acquiring the distance information may be performed in the same manner as the method of acquiring the distance information described with reference to FIGS. 15 to 28, and thus, detailed descriptions thereof will be omitted.

Based on the distance information, the controller 4000 may determine whether the distance from the lidar device to the object is within the predetermined distance. For example, the predetermined distance may be set by a user. Alternatively, the predetermined distance may be changed according to an installation environment of an object information acquiring apparatus 10000.

When the distance to the object is within the predetermined distance as the determination result, an object recognition unit 4200 may acquire the type information related to the object (S310).

For example, only when the object is positioned a short distance away from the object information acquiring apparatus 10000, the object recognition unit 4200 may acquire the type information related to the object. Here, the controller 4000 may operate an LED module 2000, thereby improving accuracy of the type information.

On the contrary, only when the object is not positioned at a short distance from the object information acquiring apparatus 10000, the controller 4000 may deactivate the LED module 2000. Alternatively, the object recognition unit 4200 may not perform a type information acquiring operation.

Accordingly, power consumption due to an operation of the LED module 2000 may be reduced.

When the object having the predetermined classification value is included in the image, the distance calculation unit 4100 may calculate the distance information related to the object using the laser module 1000 (S300). Specifically, the distance calculation unit 4100 may calculate the distance information based on an image including a laser beam emitted from the laser module 1000, wherein the image is acquired by the camera module 3000. Meanwhile, a method of acquiring the distance information may be performed in the same manner as the method of acquiring the distance information described with reference to FIGS. 15 to 28, and thus, detailed descriptions thereof will be omitted.

For example, only when an object corresponding to an obstacle is included in the image, the controller 4000 may operate the laser module 1000 to calculate distance information related to the object. Accordingly, the controller 4000 may prevent energy consumption to output an unnecessary laser beam in an obstacle-free environment.

The above-described object information acquiring apparatus 10000 may include a light detection and ranging (LiDAR) device. Alternatively, the above-described object information acquiring apparatus 10000 may be provided as the lidar device.

Although, a case in which the object information acquiring apparatus 10000 is installed in the moving body has been mainly described, the present invention is not limited thereto, and the object information acquiring apparatus 10000 may be installed at any designated place.

For example, the object information acquiring apparatus 10000 may be installed at a certain place around a door to acquire object information related to an object around the door. In this case, the object information acquiring apparatus 10000 may be installed in a position which has a certain angle.

The object information acquiring apparatus 10000 may be used for security. For example, the object information acquiring apparatus 10000 may acquire distance information and type information related to an object in a designated surveillance region.

Although the embodiment of the present invention has been described, it will be appreciated by those skilled in the art that the present invention may be variously modified and changed by adding, changing, or removing constituent components without departing from the scope of the present invention described in the claims, and the modifications or changes fall within the scope of the present invention.

What is claimed is:

1. An object information acquiring apparatus configured to acquire object information including type information and distance information related to an object, the object information acquiring apparatus comprising:
   a light receiving module configured to capture first light reflected from a first object and second light reflected from a second object different from the first object;
   a laser module configured to generate a-laser during an emission time window and not to generate laser during a non-emission time window; and
   a controller configured to:
      acquire a first image based on the first light captured during the emission time window by the light receiving module,
      acquire a second image based on the second light captured during the non-emission time window by the light receiving module,
      acquire distance information related to the first object represented in the first image based on a signal generated by the light receiving module, and acquire type information related to the second object represented in the second image based on pixel values of the second image.

2. The object information acquiring apparatus of claim 1, wherein during the emission time window, the laser module is configured to emit the laser toward the first object, and the light receiving module is configured to capture at least a portion of the laser reflected from the first object as the first light.

3. The object information acquiring apparatus of claim 1, wherein a first power consumption of the object information acquiring apparatus during the emission time window is greater than a second power consumption of the object information acquiring apparatus during the non-emission time window.

4. The object information acquiring apparatus of claim 1, further comprising a light emitting diode (LED) module configured to generate LED light and emit the LED light toward the second object during the non-emission time window,
wherein the laser module is configured to emit the laser toward the first object during the emission time window, and
wherein the light receiving module is configured to:
capture, during the emission time window, at least a portion of the laser reflected from the first object as the first light, and
capture, during the non-emission time window, at least a portion of the LED light reflected from the second object as the second light.

5. The object information acquiring apparatus of claim 4, wherein a power of the laser emitted during the emission time window is greater than a power of the LED light emitted during the non-emission time window.

6. The object information acquiring apparatus of claim 1, wherein the controller is configured to acquire the distance information based on a generation time of the signal generated by the light receiving module, and wherein the light receiving module is configured to generate the signal based on at least a portion of the laser generated by the laser module and reflected by from the first object.

7. The object information acquiring apparatus of claim 1, wherein the light receiving module includes a plurality of sensing units, and
wherein the laser module includes a plurality of laser emitting units.

8. The object information acquiring apparatus of claim 7, wherein the plurality of sensing units include a plurality of single photon avalanche diodes (SPADs), and wherein the plurality of laser emitting units include a plurality of vertical cavity surface emitting lasers (VCSELs).

9. The object information acquiring apparatus of claim 1, wherein the controller is configured to acquire distance information related to the second object represented in the second image based on the distance information related to the first object represented in the first image and a pixel position of the first object represented in the first image.

10. The object information acquiring apparatus of claim 1, wherein the controller includes a distance calculation unit configured to acquire the distance information related to the first object represented in the first image and an object recognition unit configured to acquire the type information related to the second object represented in the second image.

11. The object information acquiring apparatus of claim 10, wherein the object recognition unit includes an artificial neural network.

12. An autonomous driving vehicle, the vehicle comprising:
a body; and
the object information acquiring apparatus of claim 1 installed on the body.

13. The vehicle of claim 12, wherein the controller is configured to generate a traveling control signal of the body based on the distance information related to the first object and the type information related to the second object.

* * * * *